(12) United States Patent
Arellano et al.

(10) Patent No.: US 11,381,676 B2
(45) Date of Patent: Jul. 5, 2022

(54) QUICK LAUNCHER USER INTERFACE

(71) Applicant: QUALCOMM Incorporated, San Diego, CA (US)

(72) Inventors: Suzana Arellano, San Diego, CA (US); Livingstone Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/937,631

(22) Filed: Jul. 24, 2020

(65) Prior Publication Data

US 2021/0409539 A1    Dec. 30, 2021

Related U.S. Application Data

(60) Provisional application No. 63/046,581, filed on Jun. 30, 2020.

(51) Int. Cl.
*H04M 1/72463* (2021.01)
*G06F 3/04817* (2022.01)
*G06F 3/0488* (2022.01)

(52) U.S. Cl.
CPC ...... *H04M 1/72463* (2021.01); *G06F 3/0488* (2013.01); *G06F 3/04817* (2013.01)

(58) Field of Classification Search
CPC ............ H04M 1/72463; G06F 3/04817; G06F 3/0488
See application file for complete search history.

(56) References Cited

U.S. PATENT DOCUMENTS 9,927,953 B2 * 3/2018 Kang .................. G06F 3/04886
10,229,258 B2 * 3/2019 Kang .................. G06F 3/04886
(Continued)

FOREIGN PATENT DOCUMENTS

| EP | 2149840 A1 | 2/2010 |
|----|------------|--------|
| EP | 2672416 A1 | 12/2013 |
| EP | 3644204 A1 | 4/2020 |

OTHER PUBLICATIONS

International Search Report and Written Opinion—PCT/US2021/030724—ISA/EPO—dated Aug. 11, 2021 16 pages.
(Continued)

*Primary Examiner* — Ryan F Pitaro
(74) *Attorney, Agent, or Firm* — The Marbury Law Group, PLLC

(57) ABSTRACT

Methods executed by a processor of computing device for launching a selected application on a computing device are disclosed. Various embodiments may include authorizing a user based on a fingerprint of a finger detected on a fingerprint sensor portion of a touchscreen display matching a fingerprint of an authorized user of the computing device, determining a selected application installed on the computing device from a selective engagement of the finger on the touchscreen display, continuous from the fingerprint sensor portion, which provides an indication of a user selection of an application, and unlocking the selected application in response to the selective engagement of the finger on the touchscreen display. In some embodiments, selection of an application may be based a continuous swipe movement by the finger on the touchscreen display from the fingerprint sensor portion toward an icon on the touchscreen display representing the selected application.

22 Claims, 10 Drawing Sheets

(56) References Cited

U.S. PATENT DOCUMENTS

| | | | |
|---|---|---|---|
| 10,452,178 B2* | 10/2019 | Cho | G06F 21/32 |
| 10,754,938 B2* | 8/2020 | Jin | H04L 9/3231 |
| 10,872,220 B2* | 12/2020 | Cho | G06F 3/0416 |
| 10,922,100 B2* | 2/2021 | Lee | G06F 3/041 |
| 2009/0122018 A1* | 5/2009 | Vymenets | G06F 3/0488 |
| | | | 345/173 |
| 2009/0327963 A1* | 12/2009 | Mouilleseaux | G06F 3/0482 |
| | | | 715/834 |
| 2010/0182265 A1* | 7/2010 | Kim | G06F 1/1641 |
| | | | 345/173 |
| 2010/0214243 A1* | 8/2010 | Birnbaum | G06F 3/017 |
| | | | 345/173 |
| 2010/0269040 A1* | 10/2010 | Lee | G06F 3/04817 |
| | | | 715/702 |
| 2011/0022393 A1* | 1/2011 | Waller | G01C 21/3664 |
| | | | 704/270 |
| 2012/0131458 A1* | 5/2012 | Hayes | G06F 3/0488 |
| | | | 715/716 |
| 2013/0002580 A1* | 1/2013 | Sudou | G06F 3/038 |
| | | | 345/173 |
| 2013/0063380 A1* | 3/2013 | Wang | H04M 1/673 |
| | | | 345/173 |
| 2013/0082945 A1* | 4/2013 | Jo | G06F 3/04883 |
| | | | 345/173 |
| 2013/0091468 A1* | 4/2013 | Xie | H04M 1/67 |
| | | | 715/835 |
| 2013/0147729 A1* | 6/2013 | Lim | G06F 3/038 |
| | | | 345/173 |
| 2013/0162571 A1* | 6/2013 | Tamegai | G06F 3/04817 |
| | | | 345/173 |
| 2013/0249843 A1* | 9/2013 | Yano | H04M 1/72469 |
| | | | 345/173 |
| 2014/0181962 A1* | 6/2014 | Seo | G06F 21/629 |
| | | | 726/19 |
| 2015/0089407 A1* | 3/2015 | Suzuki | G06F 3/04817 |
| | | | 715/763 |
| 2015/0135108 A1* | 5/2015 | Pope | G06F 3/0484 |
| | | | 715/767 |
| 2016/0042166 A1* | 2/2016 | Kang | G06F 21/32 |
| | | | 726/7 |
| 2016/0109999 A1* | 4/2016 | Lee | G06F 3/04883 |
| | | | 345/173 |
| 2017/0155822 A1* | 6/2017 | Takahashi | H04N 5/2259 |
| 2017/0213019 A1 | 7/2017 | Mao | |
| 2017/0344733 A1* | 11/2017 | Woodhull | G06K 9/0002 |
| 2018/0075273 A1* | 3/2018 | Vissa | G06K 9/22 |
| 2018/0114046 A1* | 4/2018 | Shimada | G06F 3/04883 |
| 2018/0114047 A1* | 4/2018 | Kim | G06K 9/00026 |
| 2018/0157395 A1* | 6/2018 | Mhun | G06F 3/04812 |
| 2018/0365477 A1* | 12/2018 | Seol | H04M 1/725 |
| 2019/0095077 A1* | 3/2019 | Mori | H04M 1/72469 |
| 2019/0377459 A1* | 12/2019 | Jeong | G06F 3/0481 |
| 2020/0125708 A1* | 4/2020 | Jeon | G06F 3/048 |
| 2021/0058562 A1* | 2/2021 | Toguchi | H04N 5/232935 |
| 2021/0152685 A1* | 5/2021 | Li | H04M 1/72469 |

OTHER PUBLICATIONS

Rogers S., et al., "AnglePose: Robust, Precise Capacitive Touch Tracking via 3D Orientation Estimation", CHI2011, Vancouver, BC, Canada, Human Factors in Computing Systems, ACM, 2 Penn Plaza, Suite 701, New York, NY, 10121-0701, USA, May 7-12, 2011 (May 7, 2011-May 12, 2011). pp. 2575-2584, XP058041549, DOI 10.1145/1978942.1979318, ISBN: 978-1-4503-0228-9 the whole document. 10 pages.

* cited by examiner

QUICK LAUNCHER USER INTERFACE

RELATED APPLICATIONS

This application claims the benefit of priority to U.S. Provisional Application No. 63/046,581 entitled Quick Launcher User Interface filed Jun. 30, 2020, the entire contents of which are incorporated herein by reference.

BACKGROUND

Computing devices, like smart phones and devices with security keypads that include in-display fingerprint sensors, may use a fingerprint to unlock the computing device. In addition, those same computing devices generally require a second fingerprint or other security measure to log in to some restricted or sensitive applications and/or functions. In this way, users must authenticate themselves more than once before accessing some applications. While such a repetitive authentication process makes the computing device and sensitive applications more secure, it is inconvenient and increases the time it takes to launch those applications. While some contemporary computing devices include quick application launcher techniques, such techniques abbreviate the application launch process by eliminating the security measures, like fingerprint or security code authentication.

In addition, mobile computing devices use small fingerprint sensors due to a variety of factors, such as cost and battery consumption. The small size of the fingerprint sensor may limit or restrict how users may interact with the touchscreen display, particularly when the user identity is being authenticated, which may in-turn diminish an overall user experience; particularly when unlocking the computing device and attempting to use secure applications.

SUMMARY

Various aspects include methods and computing devices implementing the methods executed by a processor of a computing device for enabling authenticating a user and launching an application in a single step. Various aspects may include authorizing a user based on a fingerprint of a finger detected on a fingerprint sensor portion of a touchscreen display matching a fingerprint of an authorized user of the computing device, determining a selected application installed on the computing device from a selective engagement of the finger on the touchscreen display, continuous from the fingerprint sensor portion, which provides an indication of a user selection of an application, and unlocking the selected application in response to the selective engagement of the finger on the touchscreen display. In some aspects, determining the selected application installed on the computing device from a selective engagement of the finger on the touchscreen display may include determining the selected application in response to detecting a continuous swipe movement by the finger on the touchscreen display from the fingerprint sensor portion in a direction toward an icon on the touchscreen display representing the selected application.

Some aspects may include displaying an additional menu of secure application launch icons on the touchscreen display in response to the fingerprint detected on a fingerprint sensor portion of a touchscreen display matching a fingerprint of an authorized user of the computing device, in which the selected application is represented by one of the displayed secure application launch icons. Some aspects may include displaying the additional menu of secure application launch icons on the touchscreen display in response to the fingerprint detected on a fingerprint sensor portion of a touchscreen display matching a fingerprint of an authorized user of the computing device may include displaying the secure application launch icons encircling the fingerprint sensor portion of the touchscreen display. Some aspects may include displaying the secure application launch icons arranged as a semi-circle adjacent to the fingerprint sensor portion of the touchscreen display. Some aspects may include displaying the secure application launch icons arranged in at least one of columns or rows on the touchscreen display.

In some aspects, determining the selected application installed on the computing device from a selective engagement of the finger on the touchscreen display may include determining the selected application based on a continuous swipe movement by the finger on the touchscreen display from the fingerprint sensor portion toward one of the displayed secure application launch icons. In some aspects, determining a selected application installed on the computing device from a selective engagement of the finger on the touchscreen display, continuous from the fingerprint sensor portion, may include determining the selected application based on the displayed secure application launch icon under the finger when the finger is disengaged from the touchscreen display. In some aspects, determining the selected application installed on the computing device from the selective engagement of the finger on the touchscreen display may include determining the selected application based on a continuous swipe movement by the finger on the touchscreen display from the fingerprint sensor portion toward one of the displayed secure application launch icons when disengagement of the finger from the touchscreen display at an end of the continuous swipe movement occurs before the finger reaches a position over one of the displayed secure application launch icons.

Some aspects may further include detecting a peripheral shape of a finger contact on the touchscreen display when the finger is touching the fingerprint sensor portion, in which determining the selected application installed on the computing device from a selective engagement of the finger on the touchscreen display may include determining the selected application based on an icon on the touchscreen display that lies along a longitudinal axis of the peripheral shape of the finger contact on the touchscreen display.

Some aspects may further include detecting contact by a portion of the finger on the touchscreen display outside the fingerprint sensor portion, in which determining the selected application installed on the computing device may include determining a selected application icon on the touchscreen display that is a direction of the detected contact portion of the finger outside an area of the touchscreen display.

Further aspects include a computing device including a processor configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device for use in a computing device and configured to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
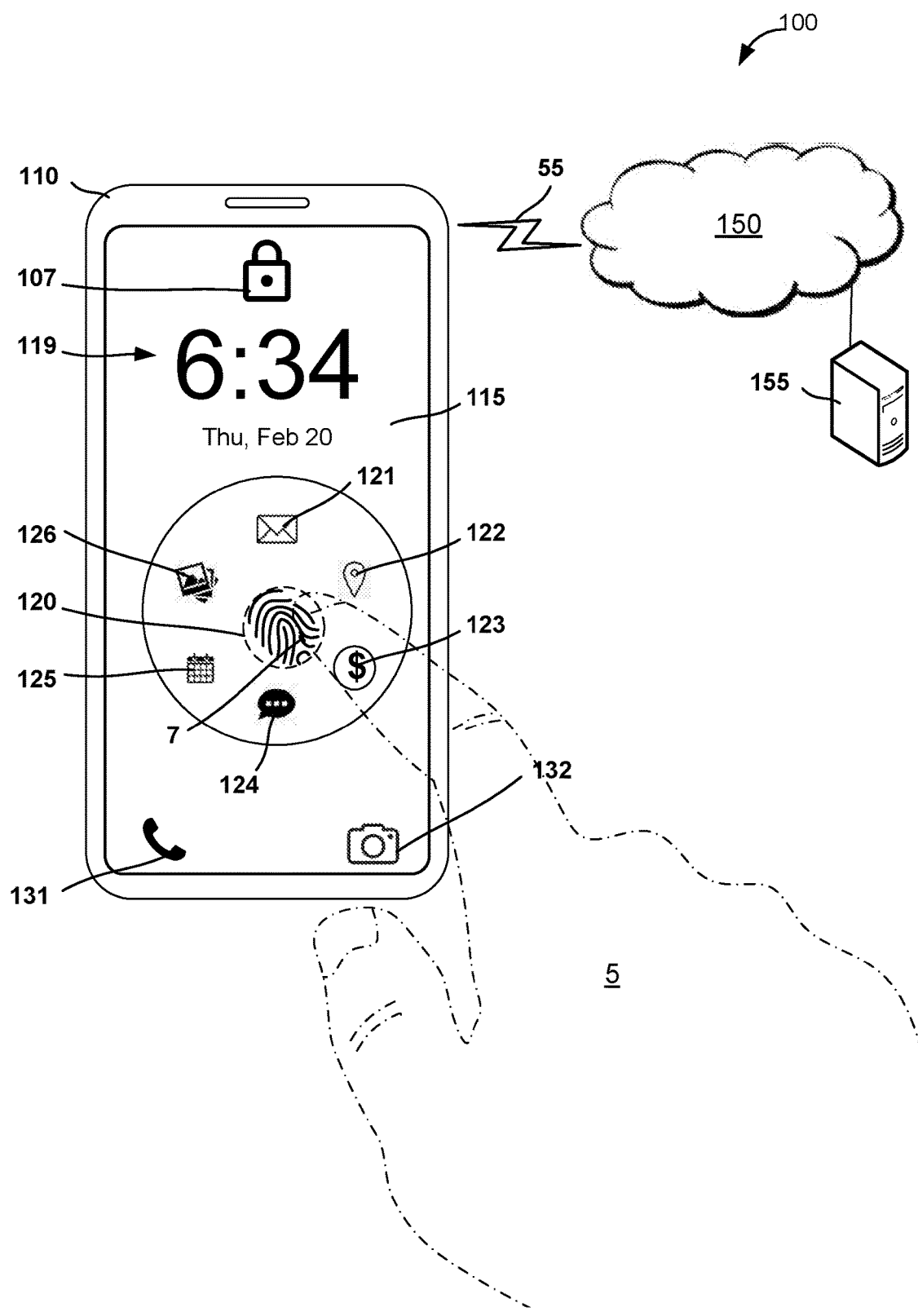
FIGS. 1A-1C are schematic diagrams illustrating a computing device ensuring a user receives scheduled notifications in accordance with various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments provide methods executed by a processor of a computing device for launching a selected application on a computing device in a quick and secure manner by detecting a finger touch on a touch sensitive display that includes a finger print sensor. Various embodiments may detect an authorized fingerprint from an initial engagement of a finger on the fingerprint sensor portion of the touchscreen display when the detected fingerprint matches that of an authorized user of the computing device. Some embodiments may include detecting a selected application installed on the computing device from a selective engagement of the finger on the fingerprint sensor portion of the touchscreen display continuing from the initial engagement in a recognizable manner that provides an indication of the application icon that the user seeks to launch.

As used herein, the term "fingerprint" refers to the unique pattern of ridges, whorls and lines on a finger or fingertip that can be detected by a fingerprint sensor that can be used to identify or authenticate an individual.

As used herein, the term "computing device" refers to an electronic device equipped with at least a processor, a touchscreen display, a fingerprint sensor and memory configured with a fingerprint database. Computing devices may include any one or all of cellular telephones, smartphones, portable computing devices, personal or mobile multi-media players, laptop computers, tablet computers, 2-in-1 laptop/table computers, smartbooks, ultrabooks, palmtop computers, wireless electronic mail receivers, multimedia Internet-enabled cellular telephones, security keypads (e.g., for opening a door, turning on/off lights and/or alarms), personal electronics such as cameras, lights, garage doors, door locks, smart home applications and appliances, wearable devices including smart watches, smart glasses, augmented/virtual reality devices, entertainment devices (e.g., wireless gaming controllers, music and video players, satellite radios, etc.), and similar electronic devices that include a memory, touch-screen display, and a programmable processor. In various embodiments, computing devices may be configured with memory and/or storage. Additionally, computing devices referred to in various example embodiments may be coupled to or include wired or wireless communication capabilities implementing various embodiments, such as network transceiver(s) and antenna(s) configured to communicate with wireless communication networks.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

Most fingerprint sensors incorporated into a touchscreen display (i.e., in-display fingerprint sensors) are relatively small (e.g., 5 mm×8 mm), which limits the types of interactions a user may have with the user interface during or as part of the process of authenticating the user. For example, various embodiments may use one or more ultrasonic and/or optical fingerprint sensors positioned within the touchscreen display and configured for use in authenticating the user. In addition, some embodiments may use one or more capacitive sensors in conjunction with one or more ultrasonic and/or optical finger print sensors, all positioned within the touchscreen display and configured for use in authenticating the user.

Various embodiments expand the types of interactions a user may have with in-display fingerprint sensors by making the rest of the user interface work together with the fingerprint sensor, thus avoiding the need to provide a larger or expanded fingerprint sensor. In particular, various embodiments use a single continuous finger engagement on a touchscreen display with an in-display fingerprint sensor to both authenticate the user and detect a secure application the user wants to launch. The single continuous finger engagement may use one or multiple fingers for the authentication and the application selection.

In some embodiments, the user's application selection may be determined by the processor from a directional swipe movement that begins over the fingerprint sensor portion of the touchscreen display (thereby authenticating the user) and extends outside of the fingerprint sensor area toward a particular application icon presented on the touchscreen display. The direction of the swipe movement, toward a select application launch icon may provide an indication as to which application has been selected. In some embodiments, the application selection may be determined based a disengagement of the finger from the touchscreen display that ends the selective engagement at a position on the touchscreen display over or near one of the displayed secure application launch icons, thereby indicating the application selected by the user for launch. In some embodiments, the application selection may be determined based on a peripheral shape of the fingerprint for finger contact area, in which the detected peripheral shape defines a longitudinal axis that extends toward an icon on the touchscreen display representing the application selected for launch. In some embodiments, the application selection may be determined based on contact by a portion of the finger that extends outside the fingerprint sensor portion of the touchscreen display.

In some embodiments, application selected for launch may be unlocked while other applications on the computing device remain locked, which provides additional security. In this way, a quick launcher method is provided that securely accesses the functions of a selected secure application from an "unlock screen" while other application of the computing device remains locked.

In some embodiments, if a selective engagement of the finger on the touchscreen display (e.g., a swipe movement) is not detected within a threshold time after an initial engagement on the fingerprint sensor, the processor may unlock all functions and applications of the computing device, rather than a selected application.

Various embodiments may be used with mobile computing devices, such as smart phones, but may also be used to control cameras, lights, garage doors, door locks in the home, and the like, without unlocking all smart phone features. In this way, using a smart home application on a mobile phone, a user may remote control a house camera, without unlocking the entire smart home application, or other smart home devices. Similarly, a user may access mail, a calendar, text messages, or a photo gallery, without unlocking a payment transfer or banking application. As a further example, in accordance with various embodiments, a touchscreen display of a house alarm system may unlock a side door, while keeping the front and/or other doors locked.

Various embodiments may increase the interactive area of a fingerprint sensor regardless of fingerprint sensor size. Also, various embodiments may provide a secure login for a user that combines with the selection of a secure application to launch without having the computing device completely unlocked. In this way, various embodiments may decrease the login time to a particular secure application by combining the user device unlock function with an application selection function into one secure step.

Figure 1B:
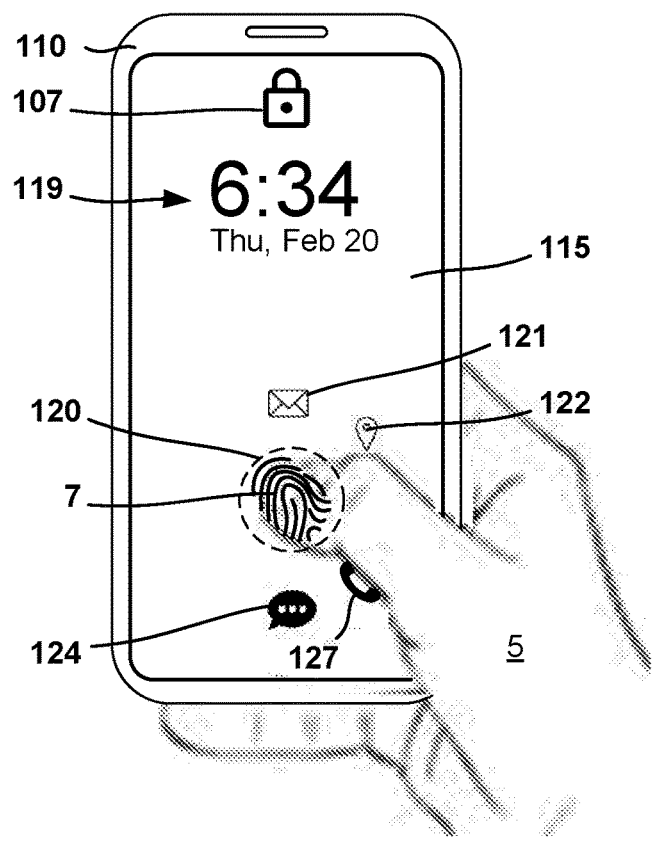
Figure 1C:
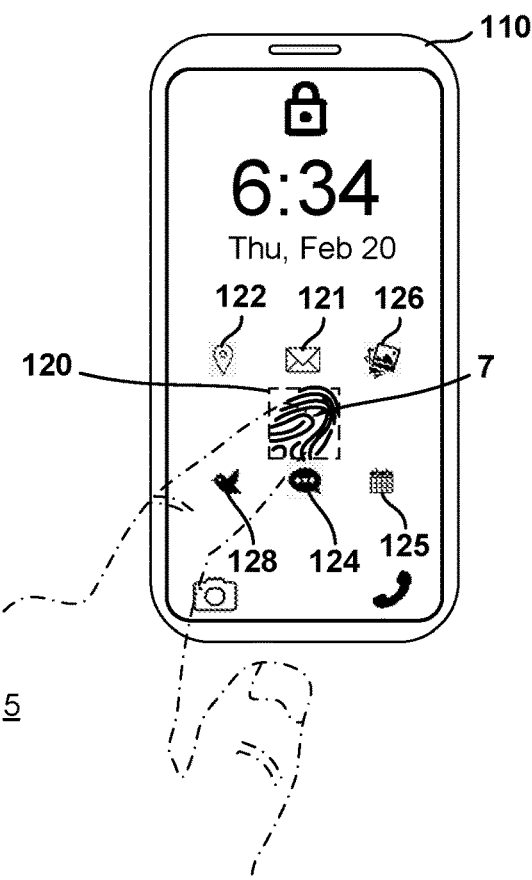

FIGS. 1A-1C are schematic diagrams of a computing device 110 (i.e., a computing device used by a user 5) in the form of a cellular telephone suitable for implementing various embodiments.

FIG. 1A illustrates the computing device 110 being handled by the user 5 in an environment 100. The environment 100 may include remote computing device(s) 155. The computing device 110 may be configured to communicate with the remote computing device(s) 155 through one or more wireless connections 55 (e.g., Wi-Fi, Bluetooth, cellular, etc.), which may be supported by a wireless local area network router (not shown), such as a Wi-Fi wireless router, or a cellular network base station. In addition to local computing devices within the vicinity of the computing device 110, the computing device 110 may be configured to reach a more remote computing devices (e.g., a server 155) through a wireless network 150, such as a Wi-Fi local area wireless network router coupled to the Internet or a cellular wireless communication network.

FIG. 1A also illustrates the computing device 110 with a touchscreen display 115 that includes a region with a fingerprint sensor 120. The touchscreen display is shown displaying a lock-screen indicator 107 and a time/date field 119. The lock-screen indicator 107 may reflect that the computing device 110 and all applications thereon are currently locked to users, at least until the fingerprint sensor 120 is used to unlock all or some application of the computing device 110, in accordance with various embodiments.

In various embodiments, the fingerprint sensor 120 is an in-display fingerprint sensor located in a portion of the touchscreen display 115. The fingerprint sensor may be an ultrasonic, optical, or other fingerprint device configured to scan a user's fingerprint 7 in response to an engagement by one or more of the user's fingers. While FIG. 1A shows a single fingerprint sensor 120, in some embodiments, the touchscreen display 115 may include more than one fingerprint sensor (e.g., 120). For example, two separate sections of the touchscreen display 115 may include separate fingerprint sensors 120, with each sensor configured for use in authenticating the user. Thus, multiple fingerprint sensors may be located in two or more separate areas of the touchscreen display 115 to enable the user to be authenticated by touching different parts of the touchscreen display 115. For ease of reference, various embodiments are described with reference to a single fingerprint sensor 120. However, the computing device 110 may be configured to perform operations of various embodiments using any one of multiple fingerprint sensors 120, and therefore the scope of the claims are not limited to a single fingerprint sensor (i.e., "a fingerprint sensor" should be construed to mean "one or more fingerprint sensors") unless such is specifically recited in a claim.

The rest of the touchscreen display 115 may be a capacitive and/or resistive screen configured to detect a small region of contact corresponding to where the user's finger touches the touchscreen display 115. A touch surface of the fingerprint sensor 120 may be flush with the top surface of the touchscreen display 115, such that the user 5 may smooth swipe a finger from the fingerprint sensor 120 to any portion of the touchscreen display 115.

In various embodiments, the lock screen may include an additional menu of secure application launch icons 121-126, disposed in proximity to the fingerprint sensor 120. In particular, FIG. 1A illustrates the additional menu of secure application launch icons 121-126 arranged in a circle (i.e., encircling) around the fingerprint sensor 120. In some embodiments, the additional menu of secure application launch icons 121-126 may appear in response to a finger touch by the user 5 on the touchscreen display 115. In some embodiments, the additional menu of secure application launch icons 121-126 may appear in response an authorized fingerprint being detected by an initial engagement of the finger with the fingerprint sensor 120.

In some embodiments, the applications associated with the secure application launch icons 121-126 may only be launched in response to detecting that an authorized fingerprint has engaged the fingerprint sensor 120. Each of the secure application launch icons 121-126 may represent and be used to launch a secure application installed on the computing device 110. In contrast, the unsecure application launch icons 131, 132, which may be part of the unsecure lock screen, and may be launched without the fingerprint authentication. In some embodiments, if the user 5 initially touches any portion of the touchscreen display 115 outside the area of the fingerprint sensor 120, then the touchscreen display 115 may only include the unsecure application launch icons 131, 132, along with the lock-screen indicator 107 and a time/date field 119, and the additional menu of secure application launch icons 121-126 may not be rendered.

In some embodiments, after touching the fingerprint sensor 120 and successfully authenticating the user's fingerprint, the user may perform a swipe movement toward one of the secure application launch icons 121-125 without lifting the finger used for the fingerprint scan. A processor of the computing device 110 may detect a selected application installed on the computing device from the swipe movement toward the icon associated with the selected application. The swipe movement may be referred to as a selective engagement of the finger on the tough screen display 115, continuous from the initial engagement (i.e., providing the fingerprint scan).

FIG. 1B also illustrates the computing device 110 with the touchscreen display 115 and fingerprint sensor 120 being used by the user 5. In contrast to FIG. 1A, FIG. 1B illustrates a shorter additional menu of secure application launch icons 121, 122, 124, 127 arranged in a semi-circle adjacent one side of the fingerprint sensor 120. The computing device 110 may include other sensors, such a motion or proximity sensor, which may be used to detect how the user 5 is holding the computing device 110. Thus, in response to detecting that the user is holding the computing device 110 from one side (e.g., the right side, as shown), the semi-circular arrangement of secure application launch icons 121, 122, 124, 127 may be arranged on that side of the computing device 110 for easy reach by the user's fingerprint finger (e.g., the thumb).

The user 5 may perform a swipe movement similar to that described above with regard to the additional menu of secure application launch icons 121-126. In particular, after touching the fingerprint sensor 120 and successfully authenticating the user's fingerprint, without lifting the finger used for the fingerprint scan, the user 5 may perform a swipe movement toward one of the semi-circular arrangements of secure application launch icons 121, 122, 124, 127. A processor of the computing device 110 may detect a selected application installed on the computing device from the swipe movement toward the icon associated with the selected application.

FIG. 1C also illustrates the computing device 110 with the touchscreen display 115 and fingerprint sensor 120 being touched by the user 5. FIG. 1C illustrates an array configuration of columns and rows for the additional menu of secure application launch icons 121, 122, 124, 125, 126, 128 surrounding the fingerprint sensor 120. Once again, after touching the fingerprint sensor 120 and successfully authenticating the user's fingerprint, without lifting the finger used for the fingerprint scan, the user 5 may perform a swipe movement toward one of the secure application launch icons 121, 122, 124, 125, 126, 128. A processor of the computing device 110 may detect a selected application installed on the computing device from the swipe movement toward the icon associated with the selected application.

FIGS. 2A-2E illustrate a user performing different types of selective engagements on the computing device 110 for selecting a secure application to launch, in accordance with various embodiments.

Figure 2A:
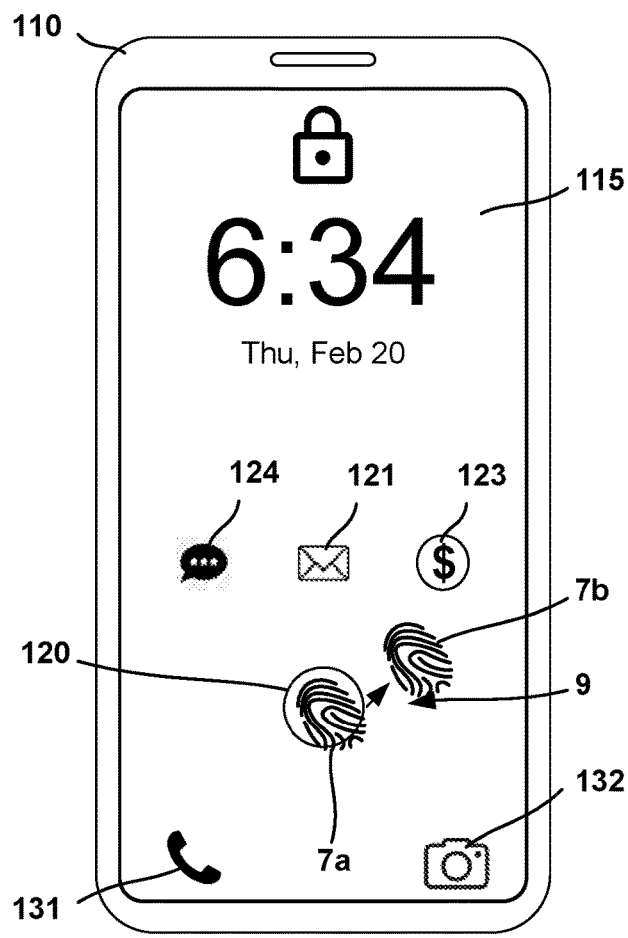
FIGS. 2A-2E are schematic diagrams illustrating a computing device ensuring a user receives scheduled notifications in accordance with various embodiments.

FIG. 2A illustrates the computing device 110 with the touchscreen display 115 and fingerprint sensor 120. The touchscreen display is presenting an abbreviated additional menu of secure application launch icons 121, 123, 124 arranged in a row above the fingerprint sensor 120. For illustrative purposes, the hand and finger of the user (e.g. 5) are not shown, but the fingerprints at positions 7a, 7b are illustrated to represent a starting position 7a of a finger touch on the fingerprint sensor 120 and an ending finger touch position 7b on the touchscreen display 115 of a swipe movement 9, in accordance with various embodiments. In some embodiments, the user may perform a swipe movement 9 that disengages the finger from the touchscreen display 115 at the end of the swipe before the finger reaches a position over any secure application launch icon, but the direction of the swipe movement 9 indicates the application that the user has selected. In the illustrated example, the user has selected the third secure application launch icon 123. Thus, a processor of the computing device 110 may detect the application associated with the third secure application launch icon 123 as the selected application from the swipe movement 9.

Figure 2B:
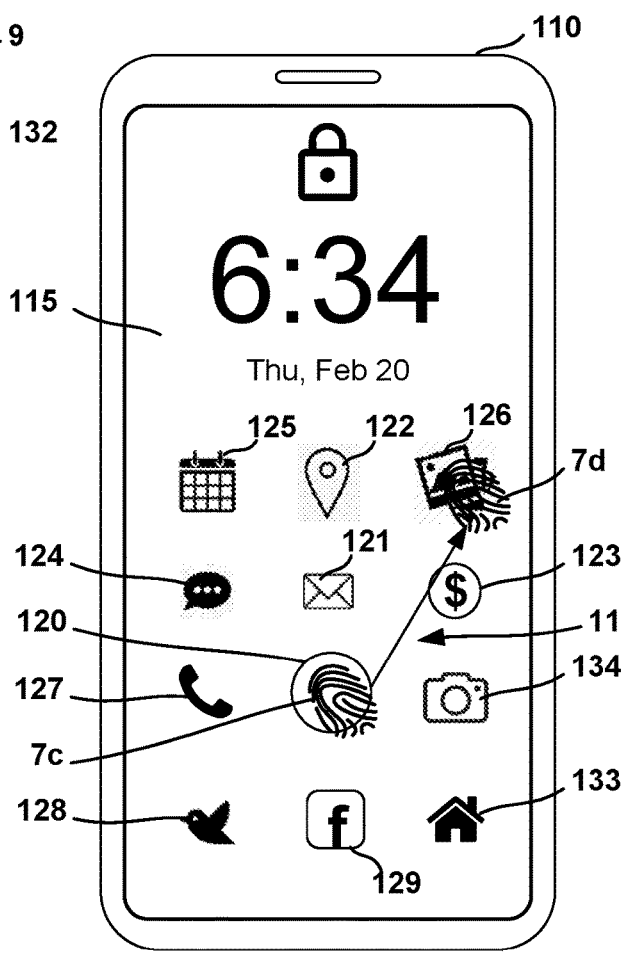

FIG. 2B illustrates the computing device 110 with the touchscreen display 115 and fingerprint sensor 120 in which the touchscreen display is presenting an extended additional menu of secure application launch icons 121-129, 133, 134 arranged in a grid (i.e., rows and columns) around the fingerprint sensor 120. Again, the fingerprints at positions 7c, 7d are intended to illustrate a starting position 7c of a finger touch on the fingerprint sensor 120 and an ending finger touch position 7d on the touchscreen display 115 of a swipe movement 11, in accordance with various embodiments. The swipe movement 11 ends with the finger touching the secure application launch icon 126 on the touchscreen display 115. In this swipe movement 11 the user maintains a finger on the touchscreen display from the initial engagement on the fingerprint sensor 120 until positioned on the icon of a selected secure application. With this swipe movement 11, which may be useful for a crowded display of icons, identification of the selected secure application is made occurs when the user's finger stops over one of the displayed secure application launch icons and then disengages from the touchscreen display. In this way, the disengagement location of the swipe movement 11 indicates to the processor the application that the user has selected, which in this instance is the secure application launch icon 126. Thus, a processor of the computing device 110 may detect from the swipe movement 11 that the application associated with the sixth secure application launch icon 126 is the selected application.

Figure 2C:
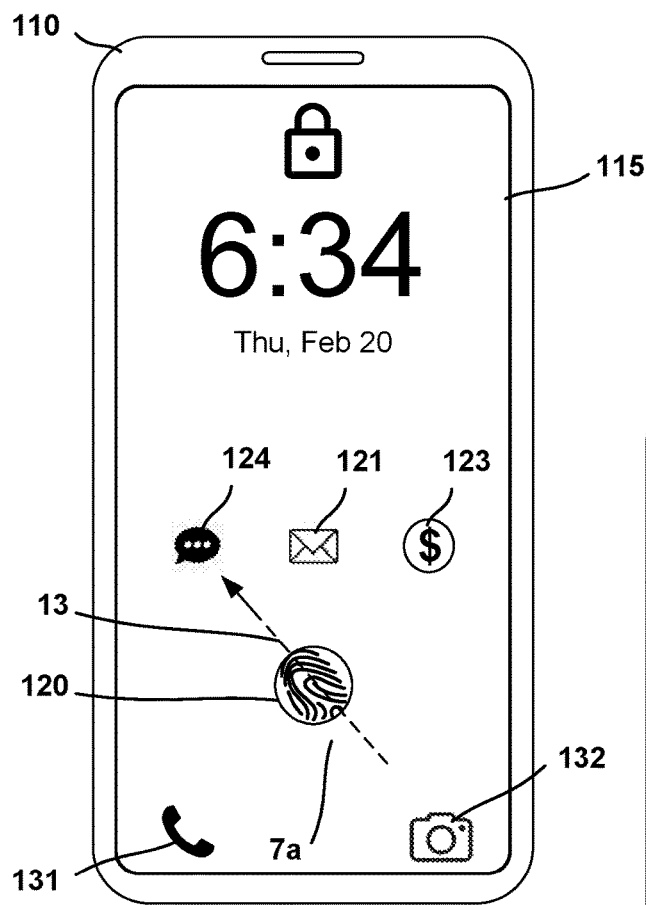

FIG. 2C illustrate an alternative way to detect a selective engagement by the user of the touchscreen display 115 and the fingerprint sensor 120 of the computing device 110 according to some embodiments. The touchscreen display 115 is presenting the abbreviated additional menu of secure application launch icons 121, 123, 124 arranged in a row above the fingerprint sensor 120. One fingerprint 7a is illustrated to represent an embodiment that uses an orientation of a detected fingerprint to determine which application is selected. By carefully angling a fingerprint to point toward a desired or intended secure application launch icon, the user may perform a selective engagement on the touchscreen display that selects a secure application to launch without performing the swipe.

In this embodiment, a processor may process signals from the touchscreen display 115 to detect a peripheral shape of the single fingerprint 7a from the initial engagement of the finger on the touchscreen display 115. The peripheral shape may reveal a longitudinal axis 13 of the single fingerprint 7a, which the processor may use to determine the selected application. In particular, the determined longitudinal axis 13 of the single fingerprint 7a may extend toward a single icon (e.g., 124). In this way, an orientation of the detected fingerprint 7a provides the selective engagement that indicates the application that the user has selected, which in this example is the fourth secure application launch icon 124. Thus, a processor of the computing device 110 may detect the application associated with the fourth secure application launch icon 124 as the selected application from the selective engagement of the finger on the touchscreen display.

Figure 2D:
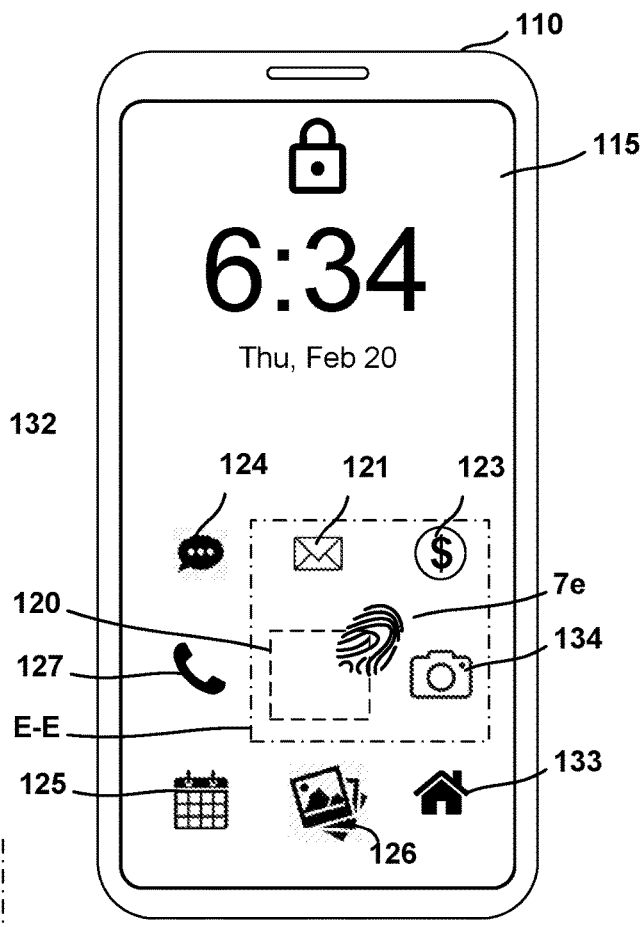
Figure 2E:
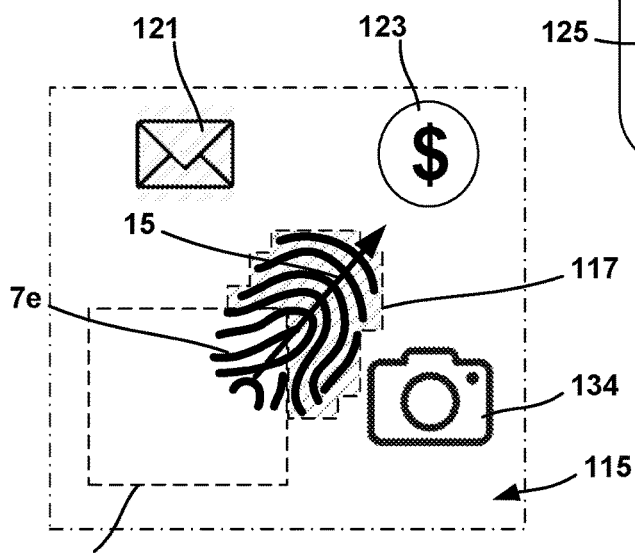

FIGS. 2D and 2E illustrate another alternative way to detect a selective engagement by the user of the touchscreen display 115 and the fingerprint sensor 120. FIG. 2E is a relief view at E-E in FIG. 2D according to some embodiments. The touchscreen display 115 is illustrated presenting an encircling additional menu of secure application launch icons 121, 123, 124, 125, 126, 127, 133, 134 arranged to encircle the fingerprint sensor 120. One fingerprint 7e is illustrated to represent another embodiment that uses a position of a detected fingerprint contact on the fingerprint sensor 120 and the touchscreen display 115 to determine which application is selected. A select number of pixels in the area of the touchscreen display 115 adjacent the fingerprint sensor 120 may be used to detect a position of the user's finger relative to the fingerprint sensor 120. By carefully positioning a touch relative to the fingerprint sensor 120 (e.g., top left, top center, top right, right side, bottom right, bottom center, bottom left, left side) to indicate a direction 15 toward a desired or intended secure application launch icon, the user may perform a selective engagement on the touchscreen display that selects a secure application to launch without performing a swipe in this embodiment. A processor of the computing device 110 may detect contact by a portion 117 of a finger touching the touchscreen display 115 outside the area of the fingerprint sensor 120. Although the adjacent portion 117 of the touchscreen display 115 around the fingerprint sensor 120 may not be configured to scan or read a fingerprint, touches on the adjacent portion 117 of the finger touch on the display may be used by the processor to determine a position of the finger touch relative to a center of the fingerprint sensor 120, and use that relationship to determine a direction 15 toward an intended icon. For example, since the fingerprint 7e is disposed in the top right corner of the fingerprint sensor 120, the processor may determine that the user intended to point in the direction 15 illustrated in FIG. 2E and conclude that the third secure application launch icon 123 is the selected application from the selective engagement of the finger on the touchscreen display.

In this embodiment, the user need not be as careful about having the entire fingerprint touch the fingerprint sensor 120, although enough of the finger needs to register with the fingerprint sensor 120 to effectively read the fingerprint for authentication. Alternatively, the user may initially touch the center location of the fingerprint sensor 120 for fingerprint detection, after which a slight finger shift into the adjacent area 117 of the touchscreen display 115 may provide an indication a direction 15 pointing towards the selected application. In this way, this type of finger shift may be considered a form of swipe movement or selective engagement that provides an indication of the detected selection.

Figure 3:
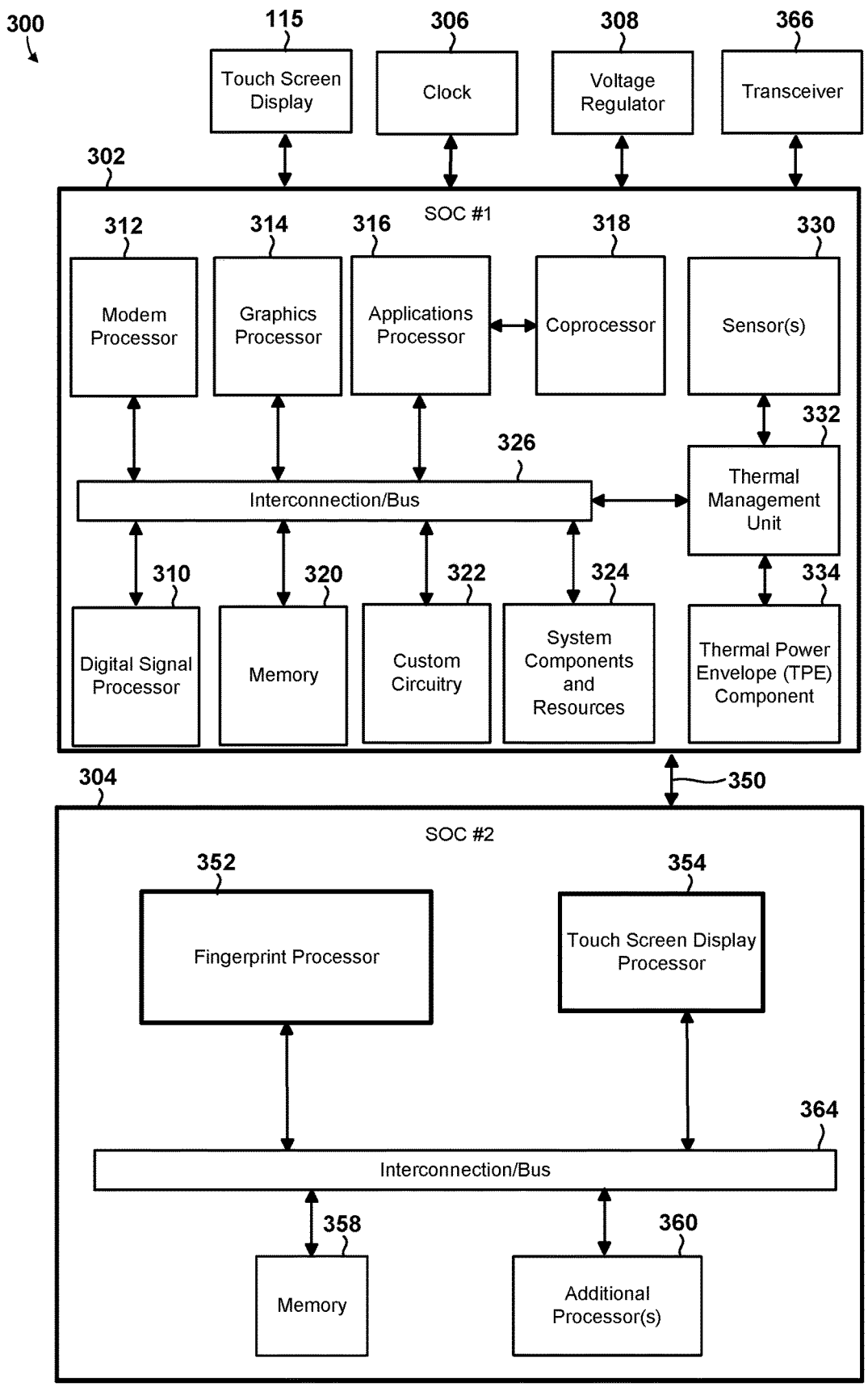
FIG. 3 is a block diagram illustrating components of an example system in a package for use in a computing device in accordance with various embodiments.

Various embodiments may be implemented using a number of single processor and multiprocessor computer systems, including a system-on-chip (SOC) or system in a package (SIP). FIG. 3 illustrates an example computing system or SIP 300 architecture that may be used in a computing device, such as the computing device (e.g., 110) implementing the various embodiments.

With reference to FIGS. 1-3, the illustrated example SIP 300 includes a two SOCs 302, 304, which may be coupled to a touchscreen display 115, a clock 306, a voltage regulator 308, and a transceiver 366 (e.g., a wireless transceiver). In some embodiments, the first SOC 302 operates as central processing unit (CPU) of the wireless device that carries out the instructions of software application programs by performing the arithmetic, logical, control and input/output (I/O) operations specified by the instructions. In some embodiments, the second SOC 304 may operate as a specialized processing unit. For example, the second SOC 304 may operate as a specialized fingerprint and/or touchscreen display processing unit responsible for detecting and/or analyzing fingerprints and/or characteristics of engagement by a finger on the touchscreen display 115, and particularly on a fingerprint sensor therein.

The first SOC 302 may include a digital signal processor (DSP) 310, a modem processor 312, a graphics processor 314, an application processor 316, one or more coprocessors 318 (e.g., vector co-processor) connected to one or more of the processors, memory 320, custom circuitry 322, system components and resources 324, an interconnection/bus module 326, one or more sensor processors 330 (e.g., ultrasonic sensor, optical sensor, capacitive sensor, thermal sensors, motion sensors, proximity sensors, a multimeter, etc.), a thermal management unit 332, and a thermal power envelope (TPE) component 334.

The second SOC 304 may include a fingerprint processor 352, a touchscreen display processor 354, an interconnection/bus module 364, memory 358, and various additional processors 360, such as an applications processor, packet processor, etc.

Each processor 310, 312, 314, 316, 318, 352, 354, 360 may include one or more cores, and each processor/core may perform operations independent of the other processors/cores. For example, the first SOC 302 may include a processor that executes a first type of operating system (e.g., FreeBSD, LINUX, OS X, etc.) and a processor that executes a second type of operating system (e.g., MICROSOFT WINDOWS 10). In addition, any or all of the processors 310, 312, 314, 316, 318, 352, 354, 360 may be included as part of a processor cluster architecture (e.g., a synchronous processor cluster architecture, an asynchronous or heterogeneous processor cluster architecture, etc.).

The first and second SOC 302, 304 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 324 of the first SOC 302 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 324 and/or custom circuitry 322 may also include circuitry to interface with peripheral devices, such as cameras, electronic displays, wireless communication devices, external memory chips, etc.

The first and second SOC 302, 304 may communicate via interconnection/bus module 350. The various processors 310, 312, 314, 316, 318, 352, 354, 360 may be interconnected to one or more memory elements 320, system components and resources 324, and custom circuitry 322, and a thermal management unit 332 via an interconnection/bus module 326. Similarly, the fingerprint processor 352 may be interconnected to the touchscreen display processor 354, memory 358, and various additional processors 360 via the interconnection/bus module 364. The interconnection/bus module 326, 350, 364 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 302, 304 may further include an input/output module (not illustrated) for communicating with resources external to the SOC, such as the touchscreen display 115, the clock 306, the voltage regulator 308, and/or the transceiver 366. Resources external to the SOC (e.g., touchscreen display 115, clock 306, voltage regulator 308, transceiver 366) may be shared by two or more of the internal SOC processors/cores.

In addition to the example SIP 300 discussed above, various embodiments may be implemented in a wide variety of computing systems, which may include a single processor, multiple processors, multicore processors, or any combination thereof.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

Figure 4:
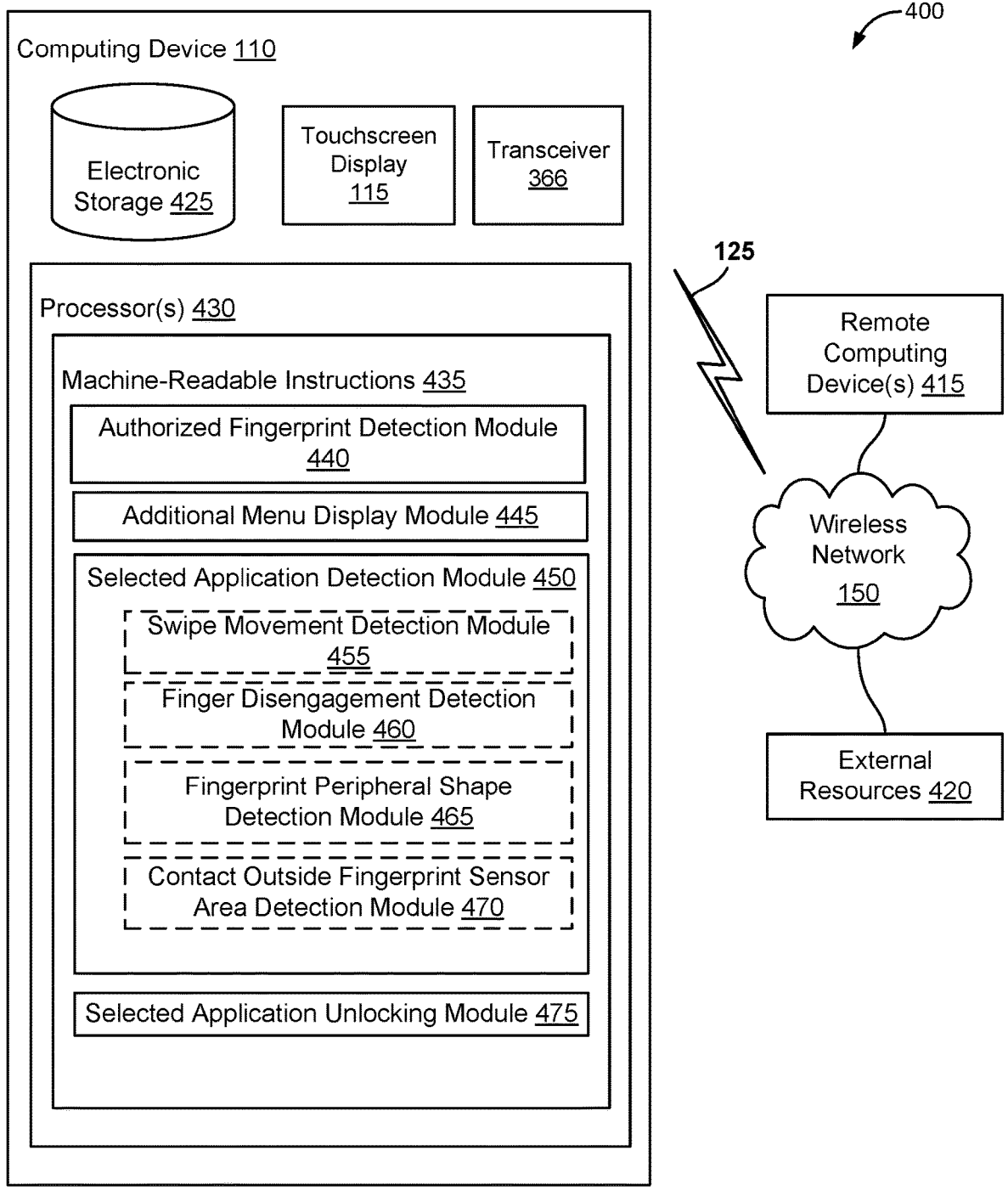
FIG. 4 shows a component block diagram of an example system configured for executed by a processor of the computing device for ensuring a user receives scheduled notifications.

FIG. 4 is a component block diagram illustrating a system 400 including a computing device 110 configured for launching a selected application in accordance with various embodiments. With reference to FIGS. 1-4, the computing device 110 may include electronic storage 425, one or more processors 430, a touchscreen display 115, the transceiver 366, and other components. The computing device 110 may include communication lines, or ports to enable the exchange of information with a network and/or other computing platforms. Illustration of the computing device 110 in FIG. 4 is not intended to be limiting. The computing device 110 may include a plurality of hardware, software, and/or firmware components operating together to provide the functionality attributed herein to the computing device 110.

Electronic storage 425 may include non-transitory storage media that electronically stores information. The electronic storage media of electronic storage 425 may include one or both of system storage that is provided integrally (i.e., substantially non-removable) with the computing device 110 and/or removable storage that is removably connectable to the computing device 110 via, for example, a port (e.g., a universal serial bus (USB) port, a firewire port, etc.) or a drive (e.g., a disk drive, etc.). Electronic storage 425 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 425 may include one or more virtual storage resources (e.g., cloud storage, a virtual private network, and/or other virtual storage resources). Electronic storage 425 may store software algorithms, information determined by processor(s) 430, information received from the computing device 110, information received from remote platform(s) 404, and/or other information that enables the computing device 110 to function as described herein.

Processor(s) 430 may be configured to provide information processing capabilities in the computing device 110. As such, the processor(s) 430 may include one or more of a digital processor, an analog processor, a digital circuit designed to process information, an analog circuit designed to process information, a state machine, and/or other mechanisms for electronically processing information. Although the processor(s) 430 is shown in FIG. 4 as a single entity, this is for illustrative purposes only. In some embodiments, processor(s) 430 may include a plurality of processing units.

The computing device 110 may be configured by machine-readable instructions 435, which may include one or more instruction modules. The instruction modules may include computer program modules. In particular, the instruction modules may include one or more of an authorized fingerprint detection module 440, an additional menu display module 445, a selected application detection module 450, an optional swipe movement detection module 455, an optional finger disengagement detection module 460, an optional fingerprint peripheral shape detection module 465, an optional contact outside fingerprint sensor area detection module 470, a selected application unlocking module 475, and/or other instruction modules.

The authorized fingerprint detection module 440 may be configured to detect an authorized fingerprint from an initial engagement of a finger on the touchscreen display 115 of the computing device 110 (i.e., a computing device). By way of non-limiting example, the authorized fingerprint detection module 440 may be configured to receive input from a fingerprint sensor (e.g., 120) located in a portion of the touchscreen display 115 and determine from that received input whether a detected fingerprint matches that of an authorized user of the computing device 110. In particular, a processor 430 of the computing device 110 may use one or more sensors (e.g., 120) to receive a digital image of a fingerprint from a user's finger touching an area of the touchscreen display 115 corresponding to the location of a fingerprint sensor. The processor may also access the electronic storage 425 to retrieve authorized fingerprint information that may be used to compare the received digital image of the detected fingerprint to one or more fingerprints of an authorized user of the computing device 110 that is/are stored in the electronic storage 425. Using pattern matching techniques, the processor may thus determine whether the received digital image of the fingerprint matches at least a portion of a stored digital image of an authorized user of the computing device 110.

The additional menu display module 445 may be configured to display an additional menu of secure application launch icons on the touchscreen display 115 in response to the initial engagement of the finger on the touchscreen display. Alternatively, the additional menu of secure application launch icons may be displayed on the touchscreen display 115 in response to a detected fingerprint matching that of an authorized user of the computing device 110. By way of non-limiting example, the secure application launch icons may represent applications and/or functions, executable by the processor 430 of the computing device.

A processor 430 of the computing device may access the electronic storage 425 to determine which secure application launch icons to display and/or where on the touchscreen display to display them. For example, user settings stored in the electronic storage 425 may indicate a set of favorite applications or more recently used applications associated with the secure application launch icons to be displayed in response to the initial engagement of the finger on the touchscreen display. Thus, the additional menu display module 445 may initially determine which secure application launch icons to display. In addition, the additional menu display module 445 may determine where and in what configuration on the touchscreen display that the secure application launch icons should be displayed. In some embodiments, the additional menu display module 445 may display the secure application launch icons in a configuration on the touchscreen display that encircles an area corresponding to the initial engagement of the finger on the fingerprint sensor of the touchscreen display. Alternatively, in some embodiments the additional menu display module 445 may display the secure application launch icons in a configuration on the touchscreen display that is arranged as a semi-circle adjacent an area corresponding to the initial engagement of the finger on the touchscreen display. As a further alternative, in some embodiments, the additional menu display module 445 may display the secure application launch icons in a configuration on the touchscreen display with icons arranged in at least one of columns or rows on the touchscreen display.

The selected application detection module 450 may be configured to detect a selected application (i.e., selected by the user) installed on the computing device from an engagement of the finger on the touchscreen display continuously since the initial engagement, which provides an indication of the detected selection. By way of non-limiting example, the processor 430 of the computing device may use the fingerprint of a finger detected by the authorized fingerprint detection module 440 to determine the selected application. In particular, the selected application detection module 450 may use one or more optional modules or sub-modules to determine the selected application, such as the optional swipe movement detection module 455, the optional finger disengagement detection module 460, the optional fingerprint peripheral shape detection module 465, and/or the optional contact outside fingerprint sensor area detection module 470. In this way, one or more of the optional modules or sub-modules (e.g., 455, 460, 465, 470) may provide information the selected application detection module 450 may use to detect the selected application. Some embodiments may include any one or more of the optional modules or sub-modules (e.g., 455, 460, 465, and/or 470).

The optional swipe movement detection module 455, which may further be part of the selected application detection module 465, may be configured to detect a swipe movement by the finger on the touchscreen display. By way of non-limiting example, the processor 430 of the computing device 110 may use information received by the fingerprint sensor and/or the touchscreen display 115 to detect the swipe movement. The swipe movement, in accordance with various embodiments, involves a detected finger movement that continuously engages the touchscreen display 115 from the point of initial engagement, through the end of the swipe movement, which may correspond to a disengagement of the finger from the touchscreen display 115. The swipe movement may extend from an area corresponding to the initial engagement in a direction toward an icon on the touchscreen display representing the detected selection. In some embodiments, the swipe movement may extend toward one of the secure application launch icons displayed by the additional menu display module 445, which identifies the selected application. In some embodiments, a disengagement of the finger from the touchscreen display at the end of the swipe movement may occur before the finger reaches a position over the one of the displayed secure application launch icons representing the selected application. Thus, even though the swipe movement did not reach the intended application launch icon, the direction of the swipe toward that application launch icon may be sufficient information for the selected application detection module 450 to detect the selected application.

The optional finger disengagement detection module 460, which may further be part of the selected application detection module 465, may be configured to detect a disengagement of the finger from the touchscreen display that ends the engagement of the finger on the touchscreen display continuously since the initial engagement. By way of non-limiting example, the processor 430 of the computing device 110 may determine that the detected disengagement occurs at a position on the touchscreen display over the one of the displayed secure application launch icons representing the selected application and provides an indication used for the detecting of the selected application.

The optional fingerprint peripheral shape detection module 465, which may further be part of the selected application detection module 465, may be configured to detect a peripheral shape of the fingerprint from the initial engagement of the finger on the touchscreen display. By way of non-limiting example, the processor 430 of the computing device 110 may determine the detected peripheral shape defines a longitudinal axis of the authorized fingerprint that extends toward an icon on the touchscreen display representing the detected selection. Thus, the detected peripheral shape with its longitudinal axis may provide an indication used for the detecting of the selected application.

The optional contact outside fingerprint sensor area detection module 470, which may further be part of the selected application detection module 465, may be configured to detect contact, by a portion of the finger providing the fingerprint, outside an area of the touchscreen display that corresponds to a fingerprint sensor. By way of non-limiting example, the processor 430 of the computing device 110 may use information from the capacitive and/or resistive sensors incorporated into the touchscreen display 115 to determine a location of the detected contact just off the fingerprint sensor. The location of the detected contact just off the fingerprint sensor may identify a side or edge of the fingerprint sensor that faces the one application launch icon representing the selected application. Thus, determining the location of the detected contact just off the fingerprint sensor may provide an indication used for the detecting of the selected application.

The selected application unlocking module 475 may be configured to unlock the selected application. By way of non-limiting example, the processor 430 of the computing device 110 may access a security layer of the computing device that is configured to unlock the selected application while maintaining at least one other application installed on the computing device locked. The security layer may restrict or allow use of one or more applications on the computing device based on whether a user is an authorized user. In some embodiments, the processor may unlock the selected application while maintaining all other currently locked applications installed on the computing device locked. Alternatively, in some embodiments, one or more other applications installed on the computing device (i.e., other than the selected application) are already unlocked at the time of the unlocking of the selected application.

The processor(s) 430 may be configured to execute modules 440, 445, 450, 455, 460, 465, 470, 475, and/or 480, and/or other modules. Processor(s) 430 may be configured to execute modules 440, 445, 450, 455, 460, 465, 470, 475, and/or 480, and/or other modules by software; hardware; firmware; some combination of software, hardware, and/or firmware; and/or other mechanisms for configuring processing capabilities on processor(s) 430. As used herein, the term "module" may refer to any component or set of components that perform the functionality attributed to the module. This may include one or more physical processors during execution of processor readable instructions, the processor readable instructions, circuitry, hardware, storage media, or any other components.

The description of the functionality provided by the different modules 440, 445, 450, 455, 460, 465, 470, 475, and/or 480 is for illustrative purposes, and is not intended to be limiting, as any of modules 440, 445, 450, 455, 460, 465, 470, 475, and/or 480 may provide more or less functionality than is described. For example, one or more of modules 440, 445, 450, 455, 460, 465, 470, 475, and/or 480 may be eliminated, and some or all of its functionality may be provided by other ones of modules 440, 445, 450, 455, 460, 465, 470, 475, and/or 480. As another example, processor(s) 352, 354 may be configured to execute one or more additional modules that may perform some or all of the functionality of modules 440, 445, 450, 455, 460, 465, 470, 475, and/or 480.

Figure 5A:
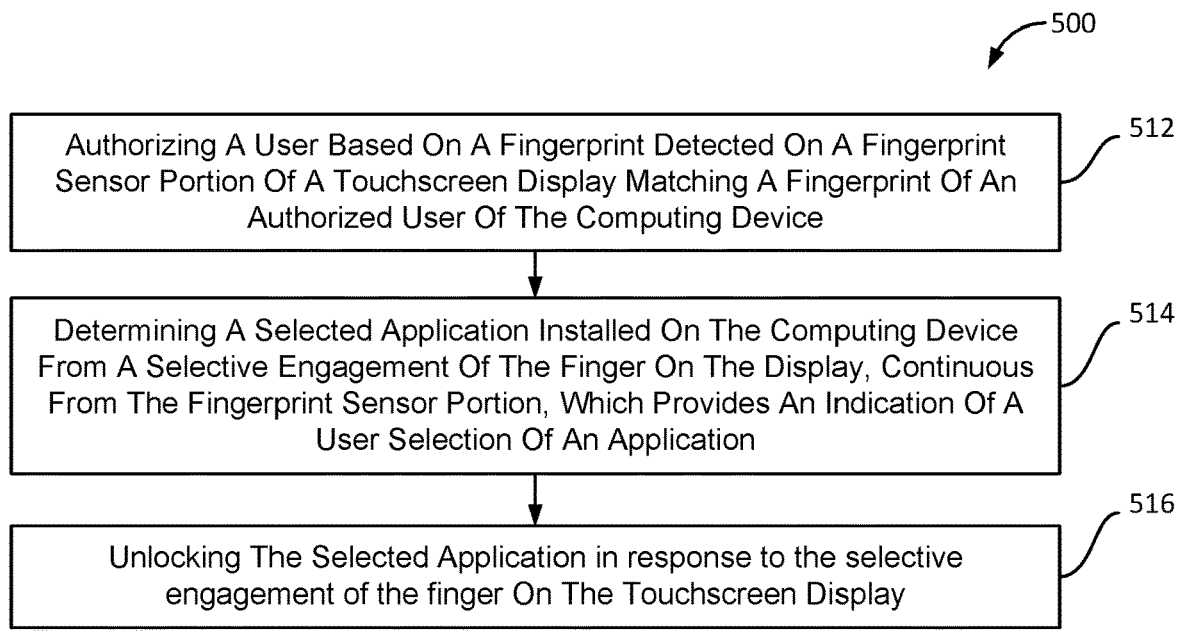
FIGS. 5A, 5B, 5C, 5D, 5E, 5F, 5G and 5H show process flow diagrams of example methods executed by a processor of the computing device for launching a selected application on the computing device according to various embodiments.

FIG. 5A illustrates a method 500 that may be executed by a processor of computing device for launching a selected application on a computing device in accordance with various embodiments. FIGS. 5B, 5C, 5D, 5E, 5F, 5G and 5H illustrate additional or alternative operations in methods 501, 502, 503, 504, 505, and 506 that may be performed as part of the method 500 in some embodiments. With reference to FIGS. 1-5H, the operations of the methods 500, 501, 502, 503, 504, 505, and 506 are intended to be illustrative. In some embodiments, methods the 500, 501, 502, 503, 504, 505, and 506 may be accomplished with one or more additional operations not described, and/or without one or more of the operations discussed. Additionally, the order in which the operations of the methods 500, 501, 502, 503, 504, 505, and 506 are illustrated in FIGS. 5A, 5B, 5C, 5D, 5E, 5F, 5G and 5H and described below is not intended to be limiting.

In various embodiments, the methods 500, 501, 502, 503, 504, 505, and 506 may be implemented in one or more processors (e.g., 310, 312, 314, 316, 318, 352, 354, 360, 430) of a computing device (e.g., 110) configured with processor-executable instructions stored on an non-transitory processor-readable storage medium. The one or more processors may include one or more devices configured through hardware, firmware, and/or software to be specifically designed for execution of one or more of the operations of the methods.

FIG. 5A illustrates a method 500 by which a processor of the computing device may launch a selected application on the computing device (i.e., a computing device) in accordance with one or more embodiments.

In block 512, the processor of the computing device may perform operations including authorizing a user based on a fingerprint of a finger detected on a fingerprint sensor portion of a touchscreen display matching a fingerprint of an authorized user of the computing device. Such operations may include determining whether a fingerprint of a finger detected by the fingerprint sensor within the touchscreen display matches a fingerprint stored in a fingerprint database of authorized user of the computing device. In block 512, the processor may use the authorized fingerprint detection module (e.g., 440) to determine whether the detected fingerprint is an authorized fingerprint, particularly for a selected application. The processor may access a database in one or more data records stored in local memory (e.g., 320, 358, 425). In some embodiments, the processor may also access a fingerprint database maintained in a remote source, such as a remote computing device or external resources using a transceiver (e.g., 366) and related components. The database may provide pattern information for matching a digital image of a detected fingerprint to one or more authorized fingerprints. In some embodiments, means for performing the operations of block 512 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

In block 514, the processor of the computing device may perform operations including determining a selected application installed on the computing device from a selective engagement of the finger on the touchscreen display, continuous from the fingerprint sensor portion, which provides an indication of a user selection of an application. To perform the operations in block 514, the processor may use the optional swipe movement detection module 455, the optional finger disengagement detection module 460, the optional fingerprint peripheral shape detection module 465, and/or the optional contact outside fingerprint sensor area detection module 470 to obtain information needed to detect the selected application. In some embodiments, means for performing the operations of block 514 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

In block 516, the processor of the computing device may perform operations including unlocking and/or launching the selected application in response to the selective engagement of the finger on the touchscreen display. In some embodiments, unlocking the selected application may further include maintaining at least one other application installed on the computing device locked. In some embodiments, unlocking the selected application may further include maintaining all other currently locked applications installed on the computing device locked. In some embodiments, one or more other applications installed on the computing device may be already unlocked at the time of the unlocking of the selected application. To perform the operations in block 516, the processor may use the selected application unlocking module (e.g., 475), which may access a security layer of the computing device that restricts/allows (i.e., locks/unlocks) use of one or more applications on the computing device. In some embodiments, means for performing the operations of block 514 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

Figure 5B:
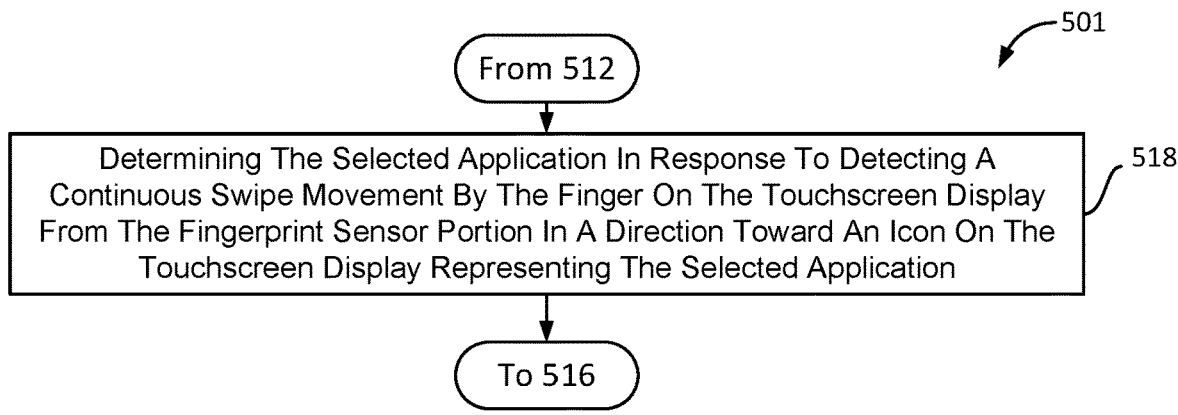

FIG. 5B illustrates a method 501 in which the processor of the computing device launches a selected application in response to a swipe motion from the fingerprint sensor in conjunction with authorizing the user based on the fingerprint detection in block 512.

Following the operations in block 512 of the method 500, the processor of the computing device may perform operations including determining the selected application in response to detecting a continuous swipe movement by the finger on the touchscreen display from the fingerprint sensor portion in a direction toward an icon on the touchscreen display representing the selected application in block 518. The swipe movement detected in block 518 may include a continuous engagement of the touchscreen display (e.g., 115) from the fingerprint sensor portion, through the end of the swipe movement, which may correspond to a disengagement of the finger from the touchscreen display. In some embodiments, a disengagement of the finger from the touchscreen display at the end of the swipe movement occurs before the finger reaches a position over the application launch icon representing the selected application. In some embodiments, a disengagement of the finger from the touchscreen display at the end of the swipe movement may occur when the finger has reached a position over the application launch icon representing the selected application. To perform the operations in block 518, the processor may use the optional swipe movement detection module 455. In some embodiments, means for performing the operations of block 518 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

Following the operations in block 518, the processor may perform the operations to unlock and/or launch the determined application in block 516 of the method 500 as described.

Figure 5C:
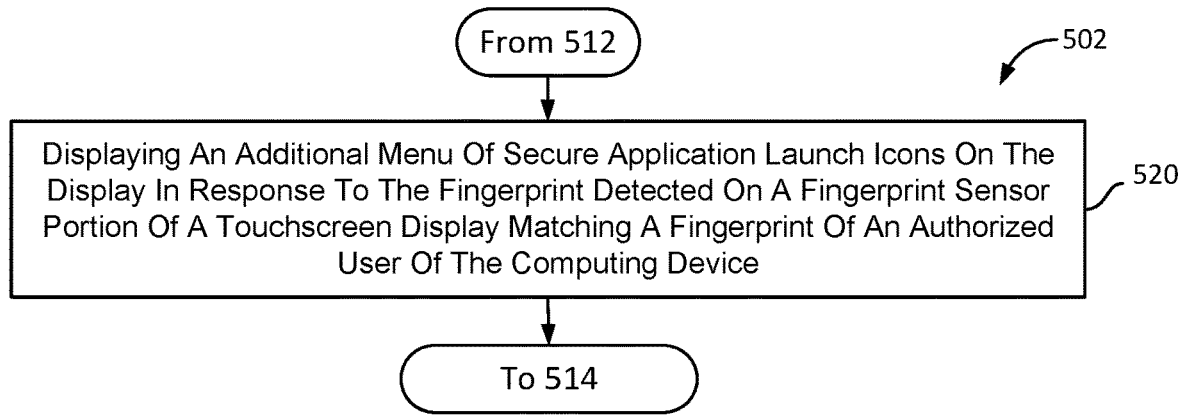

FIG. 5C illustrates a method 502 in which the processor of the computing device displays an additional menu of secure applications in response to authenticating the user in block 512 based on the fingerprint of a finger detected by the fingerprint sensor. The method 502 enables secure applications to be hidden from non-authorized users by generating icons for those applications on the lock screen only in response to the user being authenticated via the fingerprint sensor within the touchscreen display.

Following the operations in block 512 of the method 500, the processor of the computing device may perform operations including displaying an additional menu of secure application launch icons on the touchscreen display in response to the initial engagement of the finger on the touchscreen display, in block 520. The selected application may be represented by one of the secure application launch icons displayed in block 520. In some embodiments, the processor may display the secure application launch icons encircling the fingerprint sensor portion of the touchscreen display. In some embodiments, the processor may display the secure application launch icons arranged as a semi-circle adjacent to the fingerprint sensor portion of the touchscreen display. In some embodiments, the processor may display the secure application launch icons arranged in at least one of columns or rows on the touchscreen display. To perform the operations in block 520, the processor may use the additional menu display module 445. In some embodiments, means for performing the operations of block 520 may include a processor (e.g., 310, 312, 314, 316, 318, 352, 354, 360, 430) and memory (e.g., 320, 358, 425) coupled to a touchscreen display (e.g., 115).

Following the operations in block 520, the processor may perform the operations to unlock and/or launch the determined application in block 516 of the method 500 as described.

Figure 5D:
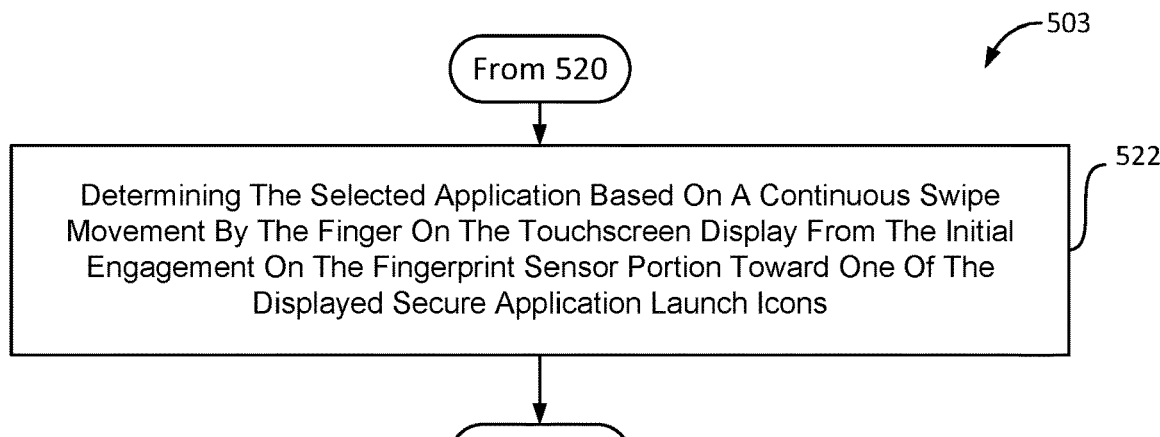

FIG. 5D illustrates a method 503 in which the processor of the computing device launches a selected application in response to a swipe gesture from the fingerprint sensor portion towards a secure application launch icon displayed in block 520.

Following the operations in block 520 of the method 502, the processor of the computing device may perform operations including determining the selected application based on a continuous swipe movement by the finger on the touchscreen display from the fingerprint sensor portion toward one of the displayed secure application launch icons in block 522. To perform the operations in block 522, the processor may use the swipe movement detection module 455. In some embodiments, means for performing the operations of block 522 may include a processor (e.g., 310, 312, 314, 316, 318, 352, 354, 360, 430) and memory (e.g., 320, 358, 425) coupled to a touchscreen display (e.g., 115).

Following the operations in block 522, the processor may perform the operations to unlock and/or launch the determined application in block 516 of the method 500 as described.

Figure 5E:
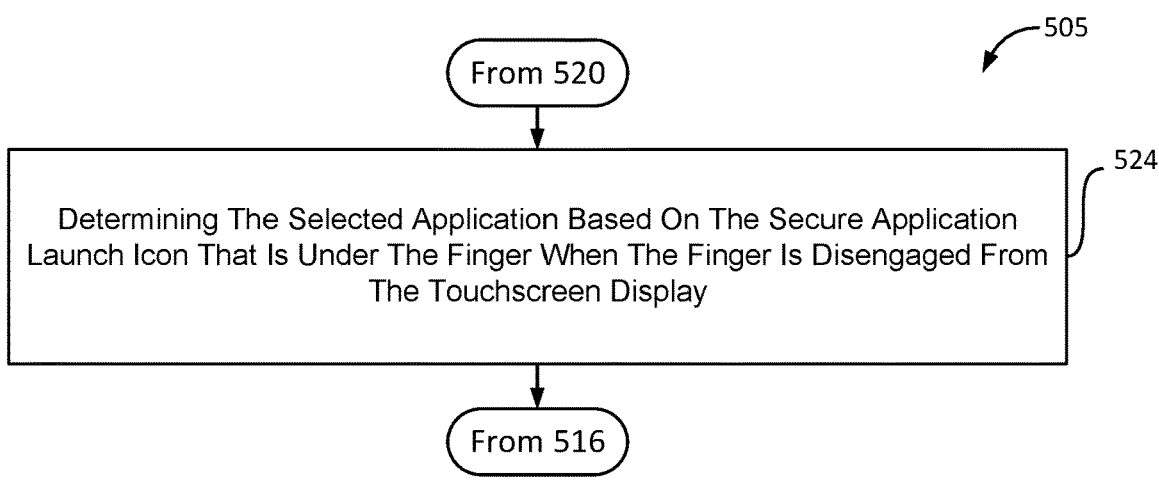

FIG. 5E illustrates a method 504 in which the processor of the computing device launches a selected application in response to a swipe gesture from the fingerprint sensor portion that ends on top of the icon of a secure application launch displayed in block 520.

Following the operations in block 520 of the method 502, in block 524 the processor of the computing device may perform operations including determining the selected application based on the secure application launch icon displayed in block 522 that is under the finger when the finger is disengaged from the touchscreen display. To perform the operations in block 524, the processor may use the swipe movement detection module 455 and the finger disengagement detection module 460. In some embodiments, means for performing the operations of block 524 may include a processor (e.g., 310, 312, 314, 316, 318, 352, 354, 360, 430) and memory (e.g., 320, 358, 425) coupled to a touchscreen display (e.g., 115).

Following the operations in block 524, the processor may perform the operations to unlock and/or launch the determined application in block 516 of the method 500 as described.

Figure 5F:
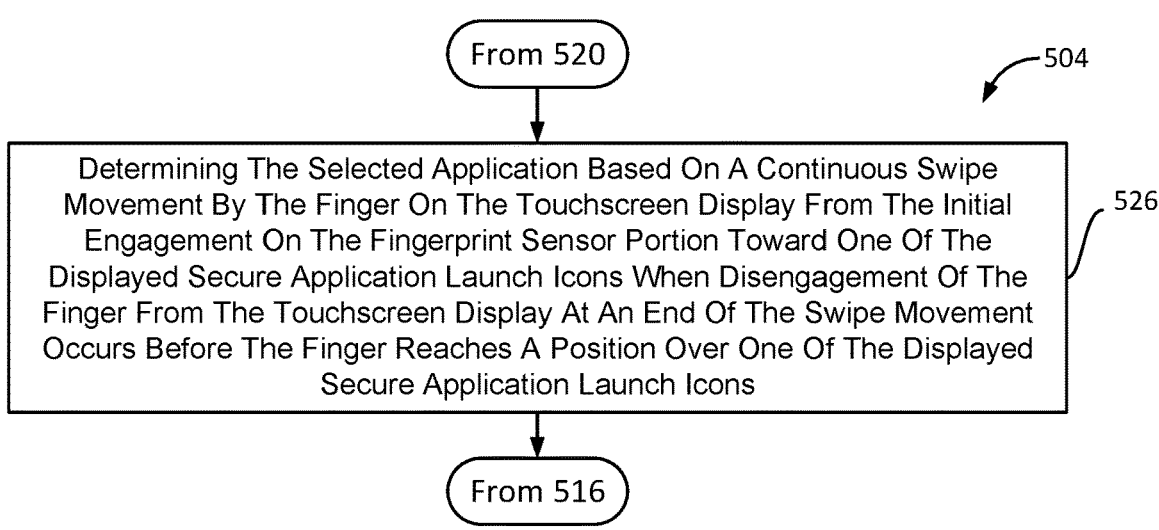

FIG. 5F illustrates a method 505 in which the processor of the computing device launches a selected application in response to a swipe gesture from the fingerprint sensor portion that ends before reaching one of the secure application launch icon displayed in block 520.

Following the operations in block 520 of the method 502, in block 526 the processor of the computing device may perform operations including determining the selected application based on a continuous swipe movement by the finger on the touchscreen display from the fingerprint sensor portion toward one of the displayed secure application launch icons when disengagement of the finger from the touchscreen display at an end of the continuous swipe movement occurs before the finger reaches a position over one of the displayed secure application launch icons. For example, the processor may identify an icon that is in the direction of the swipe when the finger disengaged from the touchscreen display. As another example, the processor may identify an icon that is closes to the location where the finger disengaged from the touchscreen display. To perform the operations in block 522, the processor may use the swipe movement detection module 455 and the finger disengagement detection module 460. In some embodiments, means for performing the operations of block 522 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

Following the operations in block 526, the processor may perform the operations to unlock and/or launch the determined application in block 516 of the method 500 as described.

Figure 5G:
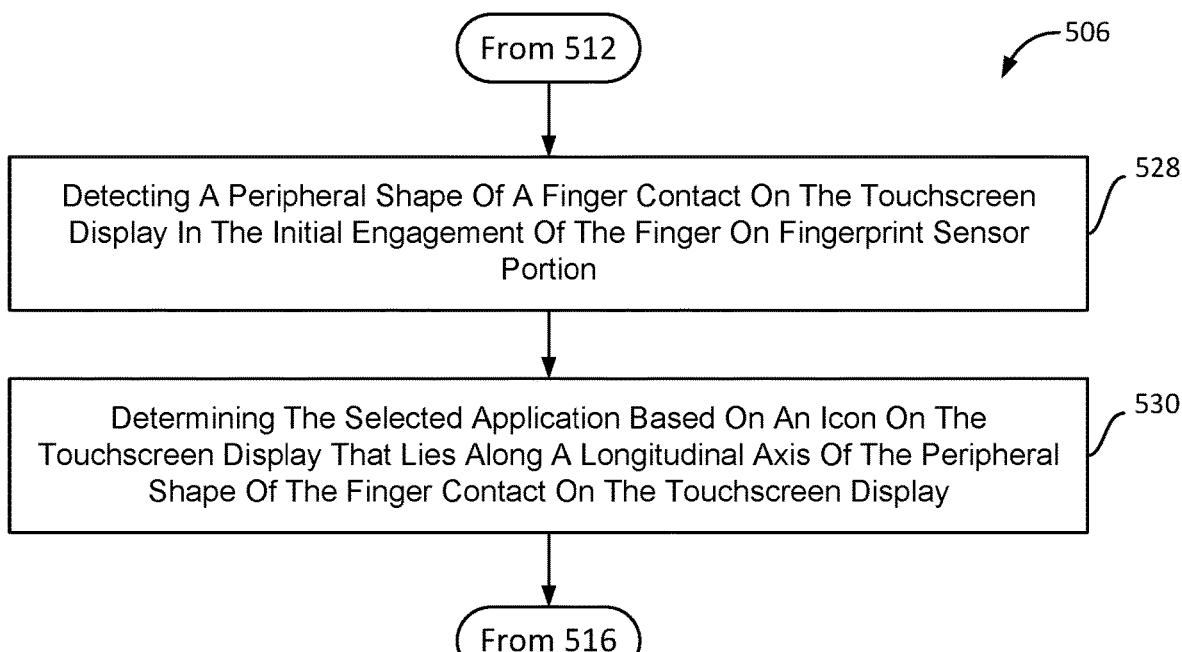

FIG. 5G illustrates a method 506 in which the processor of the computing device launches a selected application based on a shape and longitudinal axis of a finger touch shape in conjunction with the authorized fingerprint detection.

Following the operations in block 512 (or optionally 522) of the method 500, the processor of the computing device may perform operations including detecting a peripheral shape of a finger contact on the touchscreen display when the finger is touching the fingerprint sensor portion in block 528. The detected peripheral shape of the fingerprint may define a longitudinal axis of the authorized fingerprint that extends toward an icon on the touchscreen display representing the detected selection.

In block 530, the processor of the computing device may perform operations including determining the selected application based on an icon on the touchscreen display that lies along a longitudinal axis of the peripheral shape of the finger contact on the touchscreen display. In this way, the longitudinal axis defined by the detected peripheral shape of the user's finger on the fingerprint sensor portion (and other portions) of the touchscreen display may analyzed to determine a line pointing toward a selected application launch icon for the selected application as illustrated in FIG. 2C.

To perform the operations in blocks 528 and 530, the processor may use the optional fingerprint peripheral shape detection module 465. In some embodiments, means for performing the operations of blocks 528 and 530 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

Following the operations in block 507, the processor may perform the operations to unlock and/or launch the determined application in block 516 of the method 500 as described.

Figure 5H:
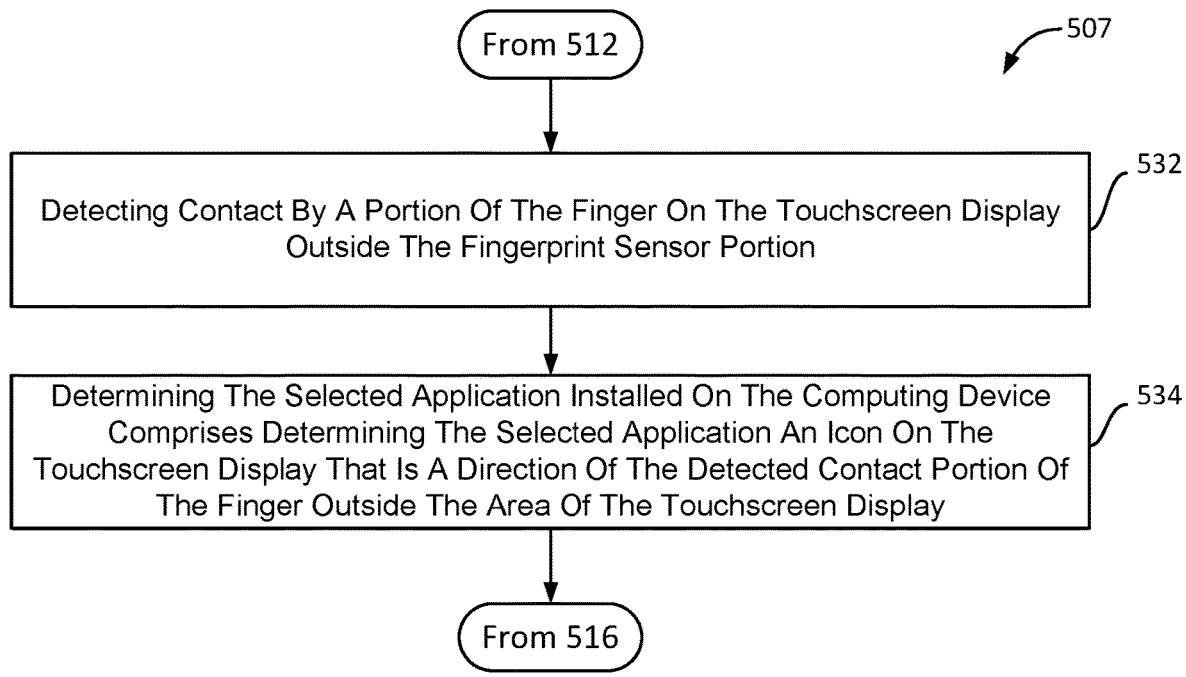

FIG. 5H illustrates a method 510 in which the processor of the computing device selects an application to launch based on a portion of a finger touch that extends onto the touchscreen display beyond the fingerprint portion in conjunction with the authorized fingerprint detection. The location of the detected contact by the finger outside the fingerprint sensor portion of the touchscreen display (i.e., off the fingerprint sensor as illustrated in FIG. 2D) may provide an indication used for the detecting of the selected application.

Following the operations in block 512 (or optionally 522) of the method 500 the processor of the computing device may perform operations including detecting contact by a portion of the finger on the touchscreen display outside the fingerprint sensor portion of the display in block 532.

In block 534, the processor of the computing device may perform operations including determining the selected application installed on the computing device comprises determining a selected application icon on the touchscreen display that is a direction of the detected contact portion of the finger outside an area of the touchscreen display. In this way, the position of the finger touch on the touchscreen display relative to the fingerprint sensor portion may analyzed to determine a direction toward a selected application launch icon for the selected application as illustrated in FIG. 2D.

To perform the operations in blocks 532 and 534, the processor may use the optional contact outside fingerprint sensor area detection module 470. In some embodiments, means for performing the operations of block 526 may include a processor (e.g., 310, 312, 314, 316, 318, 352, 354, 360, 430) and memory (e.g., 320, 358, 425) coupled to a touchscreen display (e.g., 115) that includes a fingerprint sensor (e.g., 120).

Following the operations in block 534, the processor may perform the operations to unlock and/or launch the determined application in block 516 of the method 500 as described.

Figure 6:
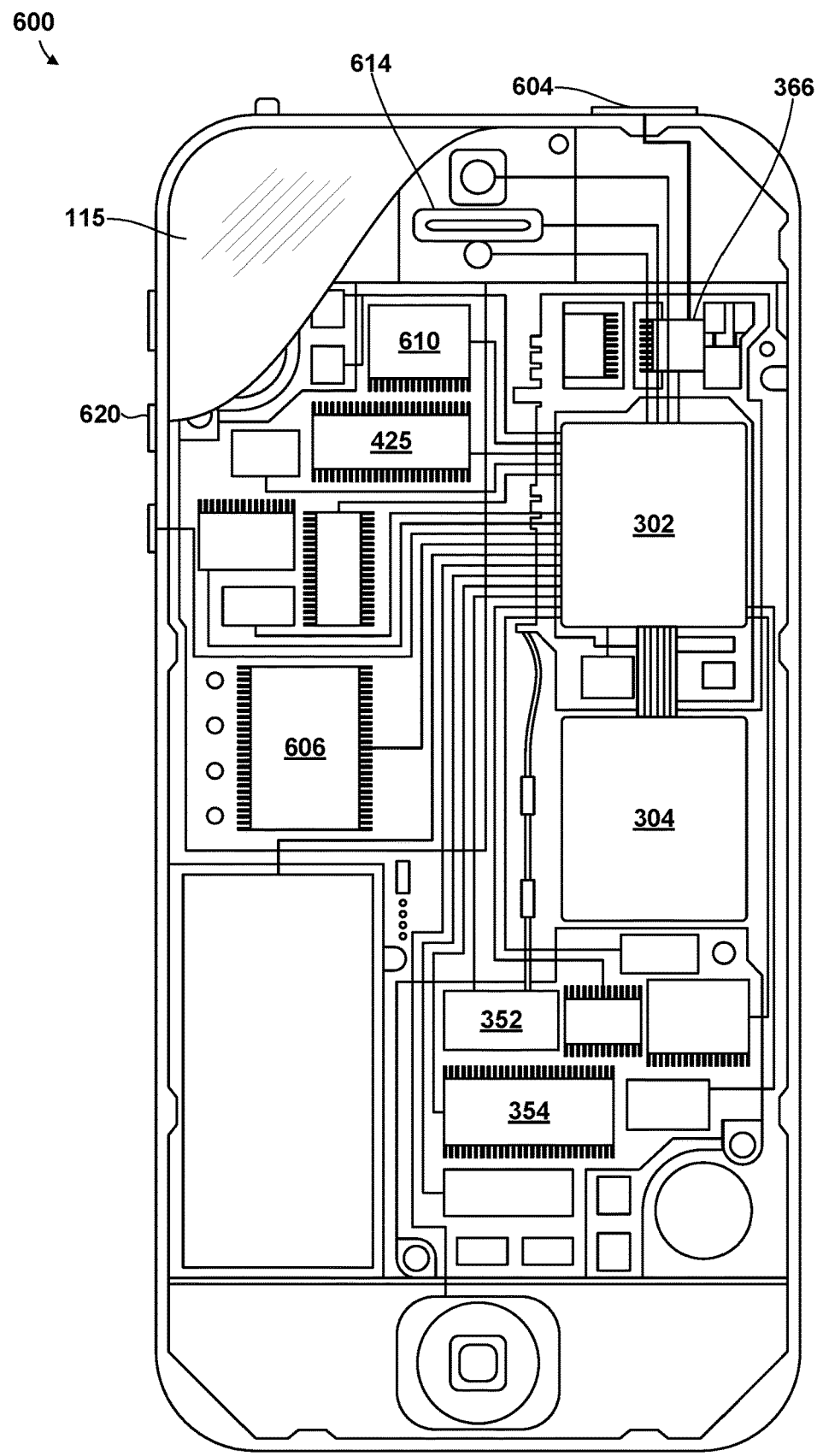
FIG. 6 is a component block diagram of a mobile computing device suitable for use with various embodiments.

The various embodiments (including, but not limited to, embodiments discussed above with reference to FIGS. 1-5H) may be implemented on a variety of computing devices, an example of which is illustrated in FIG. 6 in the form of a smartphone mobile computing device. With reference to FIGS. 1-6, a mobile computing device 600 may include a first SoC 302 (e.g., a SoC-CPU) coupled to a second SoC 304 (e.g., a fingerprint detection SoC). The first, second, and/or third SoCs 302, 304, and 606 may be coupled to electronic storage 425 (i.e., internal memory), a touchscreen display 115, a touchscreen display processor 354, a fingerprint sensor processor 352 and a speaker 614. Additionally, the mobile computing device 600 may include one or more antenna 604 for sending and receiving electromagnetic radiation that may be connected to one or more transceiver 366 (e.g., a wireless data link and/or cellular transceiver, etc.) coupled to one or more processors in the first, second, and/or third SoCs 302, 304, and 606. Mobile computing devices 600 may also include menu selection buttons or rocker switches 620 for receiving user inputs.

Mobile computing devices 600 may additionally include a sound encoding/decoding (CODEC) circuit 610, which digitizes sound received from a microphone into data packets suitable for wireless transmission and decodes received sound data packets to generate analog signals that are provided to the speaker to generate sound. Also, one or more of the processors in the first, second, and/or third SoCs 302, 304, and 606, transceiver 366 and CODEC circuit 610 may include a digital signal processor (DSP) circuit (not shown separately).

The processors implementing various embodiments may be any programmable microprocessor, microcomputer or multiple processor chip or chips that can be configured by software instructions (applications) to perform a variety of functions, including the functions of the various aspects described in this application. In some communication devices, multiple processors may be provided, such as one processor dedicated to wireless communication functions and one processor dedicated to running other applications. Typically, software applications may be stored in the internal memory before they are accessed and loaded into the processor. The processor may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a processor of a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various aspects. Such services and standards may include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020TM), EDGE, advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), integrated digital enhanced network (iden), C-V2X, V2V, V2P, V2I, and V2N, etc. Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various aspects illustrated and described are provided merely as examples to illustrate various features of the claims. However, features shown and described with respect to any given aspect are not necessarily limited to the associated aspect and may be used or combined with other aspects that are shown and described. Further, the claims are not intended to be limited by any one example aspect. For example, one or more of the operations of the methods may be substituted for or combined with one or more operations of the methods.

The foregoing method descriptions and the process flow diagrams are provided merely as illustrative examples and are not intended to require or imply that the operations of various aspects must be performed in the order presented. As will be appreciated by one of skill in the art the order of operations in the foregoing aspects may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the aspects disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such aspect decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make or use the claims. Various modifications to these aspects will be readily apparent to those skilled in the art, and the generic principles defined herein may be applied to other aspects without departing from the scope of the claims. Thus, the present disclosure is not intended to be limited to the aspects shown herein but is to be accorded the widest scope consistent with the following claims and the principles and novel features disclosed herein.

What is claimed is:

1. A method of launching a selected application on a computing device, comprising:
    authorizing a user based on a fingerprint of a finger detected on a fingerprint sensor portion of a touchscreen display matching a fingerprint of an authorized user of the computing device;
    determining a selected application installed on the computing device from a selective engagement of the finger on the touchscreen display, based on a detected initial contact location on the touchscreen display, by a portion of the finger, outside the fingerprint sensor portion, wherein an application icon on the touchscreen display that is aligned with a direction extending from the fingerprint sensor portion toward the detected initial contact location provides an indication of a user selection of the application icon and identifies the selected application; and
    unlocking the selected application in response to the selective engagement of the finger on the touchscreen display.

2. The method of claim 1, wherein determining the selected application installed on the computing device from a selective engagement of the finger on the touchscreen display comprises determining the selected application in response to detecting a continuous swipe movement by the finger on the touchscreen display from the fingerprint sensor portion in a direction toward an icon on the touchscreen display representing the selected application.

3. The method of claim 1, further comprising:
    displaying an additional menu of secure application launch icons on the touchscreen display in response to the fingerprint detected on a fingerprint sensor portion of a touchscreen display matching a fingerprint of an authorized user of the computing device, wherein the selected application is represented by one of the displayed secure application launch icons.

4. The method of claim 3, wherein displaying the additional menu of secure application launch icons on the touchscreen display in response to the fingerprint detected on a fingerprint sensor portion of a touchscreen display matching a fingerprint of an authorized user of the computing device comprises displaying the secure application launch icons encircling the fingerprint sensor portion of the touchscreen display.

5. The method of claim 3, wherein displaying the additional menu of secure application launch icons on the touchscreen display in response to the fingerprint detected on a fingerprint sensor portion of a touchscreen display matching a fingerprint of an authorized user of the computing device comprises displaying the secure application launch icons arranged as a semi-circle adjacent to the fingerprint sensor portion of the touchscreen display.

6. The method of claim 3, wherein displaying the additional menu of secure application launch icons on the touchscreen display in response to the fingerprint detected on a fingerprint sensor portion of a touchscreen display matching a fingerprint of an authorized user of the computing device comprises displaying the secure application launch icons arranged in at least one of columns or rows on the touchscreen display.

7. The method of claim 3, wherein determining the selected application installed on the computing device from a selective engagement of the finger on the touchscreen display comprises determining the selected application based on a continuous swipe movement by the finger on the touchscreen display from the fingerprint sensor portion toward one of the displayed secure application launch icons.

8. The method of claim 1, further comprising detecting a peripheral shape of a finger contact on the touchscreen display when the finger is touching the fingerprint sensor portion,
    wherein determining the selected application installed on the computing device from a selective engagement of the finger on the touchscreen display comprises determining the selected application based on an icon on the touchscreen display that lies along a longitudinal axis of the peripheral shape of the finger contact on the touchscreen display.

9. A computing device comprising:
    a touchscreen display;
    a fingerprint sensor within a portion of the touchscreen display;
    a memory; and
    a processor coupled to the touchscreen display, the fingerprint sensor and the memory, and configured with processor-executable instructions to:
        authorize a user based on a fingerprint of a finger detected on a fingerprint sensor portion of a touchscreen display matching a fingerprint of an authorized user of the computing device;
        determine a selected application installed on the computing device from a selective engagement of the finger on the touchscreen display, based on a detected initial contact location on the touchscreen display, by a portion of the finger, outside the fingerprint sensor portion, wherein an application icon on the touchscreen display that is aligned with a direction extending from the fingerprint sensor portion toward the detected initial contact location provides an indication of a user selection of the application icon and identifies the selected application; and
        unlock the selected application in response to the selective engagement of the finger on the touchscreen display.

10. The computing device of claim 9, wherein the processor is further configured with processor-executable instructions to:
    the selected application installed on the computing device from a selective engagement of the finger on the touchscreen display by determining the selected application in response to detecting a continuous swipe movement by the finger on the touchscreen display from the fingerprint sensor portion in a direction toward an icon on the touchscreen display representing the selected application.

11. The computing device of claim 9, wherein the processor is further configured with processor-executable instructions to:
    display an additional menu of secure application launch icons on the touchscreen display in response to the fingerprint detected on a fingerprint sensor portion of a touchscreen display matching a fingerprint of an authorized user of the computing device, wherein the selected application is represented by one of the displayed secure application launch icons.

12. The computing device of claim 11, wherein the processor is further configured with processor-executable instruction to display the secure application launch icons encircling the fingerprint sensor portion the touchscreen display.

13. The computing device of claim 11, wherein the processor is further configured with processor-executable instructions to display the secure application launch icons arranged as a semi-circle adjacent to the fingerprint sensor portion of the touchscreen display.

14. The computing device of claim 11, wherein the processor is further configured with processor-executable instructions to display the secure application launch icons arranged in at least one of columns or rows on the touchscreen display.

15. The computing device of claim 11, wherein the processor is further configured with processor-executable instructions to determine the selected application installed on the computing device from a selective engagement of the finger on the touchscreen display comprises determining the selected application based on a continuous swipe movement by the finger on the touchscreen display from the fingerprint sensor portion toward one of the displayed secure application launch icons.

16. The computing device of claim 9, wherein the processor is further configured with processor-executable instructions to:
 detect a peripheral shape of a finger contact on the touchscreen display when the finger is touching the fingerprint sensor portion; and
 determine the selected application installed on the computing device from a selective engagement of the finger on the touchscreen display by determining the selected application based on an icon on the touchscreen display that lies along a longitudinal axis of the peripheral shape of the finger contact on the touchscreen display.

17. A non-transitory processor-readable medium having stored thereon processor-executable instructions configured to cause a processor of a computing device to perform operations comprising:
 authorizing a user based on a fingerprint of a finger detected on a fingerprint sensor portion of a touchscreen display matching a fingerprint of an authorized user of the computing device;
 determining a selected application installed on the computing device from a selective engagement of the finger on the touchscreen display, based on a detected initial contact location on the touchscreen display, by a portion of the finger, outside the fingerprint sensor portion, wherein an application icon on the touchscreen display that is aligned with a direction extending from the fingerprint sensor portion toward the detected initial contact location provides an indication of a user selection of the application icon and identifies the selected application; and
 unlocking the selected application in response to the selective engagement of the finger on the touchscreen display.

18. The non-transitory processor-readable medium of claim 17, wherein the stored processor-executable instructions are configured to cause a processor of a computing device to perform operations such that determining the selected application installed on the computing device from a selective engagement of the finger on the touchscreen display comprises determining the selected application in response to detecting a continuous swipe movement by the finger on the touchscreen display from the fingerprint sensor portion in a direction toward an icon on the touchscreen display representing the selected application.

19. The non-transitory processor-readable medium of claim 17, wherein the stored processor-executable instructions are configured to cause a processor of a computing device to perform operations further comprising:
 displaying an additional menu of secure application launch icons on the touchscreen display in response to the fingerprint detected on a fingerprint sensor portion of a touchscreen display matching a fingerprint of an authorized user of the computing device, wherein the additional menu of secure application launch icons is displayed:
 encircling the fingerprint sensor portion of the touchscreen display;
 arranged as a semi-circle adjacent to the fingerprint sensor portion of the touchscreen display; or
 arranged in at least one of columns or rows on the touchscreen display.

20. The non-transitory processor-readable medium of claim 19, wherein the stored processor-executable instructions are configured to cause a processor of a computing device to perform operations such that determining the selected application installed on the computing device from a selective engagement of the finger on the touchscreen display comprises determining the selected application based on a continuous swipe movement by the finger on the touchscreen display from the fingerprint sensor portion toward one of the displayed secure application launch icons.

21. The non-transitory processor-readable medium of claim 19, wherein:
 the stored processor-executable instructions are configured to cause a processor of a computing device to perform operations further comprising detecting a peripheral shape of a finger contact on the touchscreen display when the finger is touching the fingerprint sensor portion; and
 the stored processor-executable instructions are configured to cause a processor of a computing device to perform operations such that determining the selected application installed on the computing device from a selective engagement of the finger on the touchscreen display comprises determining the selected application based on an icon on the touchscreen display that lies along a longitudinal axis of the peripheral shape of the finger contact on the touchscreen display.

22. A computing device, comprising:
 a touchscreen display;
 means for authorizing a user based on a fingerprint of a finger detected on a fingerprint sensor portion of a touchscreen display matching a fingerprint of an authorized user of the computing device;
 means for determining a selected application installed on the computing device from a selective engagement of the finger on the touchscreen display, based on a detected initial contact location on the touchscreen display, by a portion of the finger, outside the fingerprint sensor portion, wherein an application icon on the touchscreen display that is aligned with a direction extending from the fingerprint sensor portion toward the detected initial contact location provides an indication of a user selection of the application icon and identifies the selected application; and means for unlocking the selected application in response to the selective engagement of the finger on the touchscreen display.

\* \* \* \* \*